United States Patent
Ramaswamy et al.

(10) Patent No.: US 8,918,802 B2
(45) Date of Patent: Dec. 23, 2014

(54) METHODS AND APPARATUS TO MONITOR MEDIA EXPOSURE

(75) Inventors: Arun Ramaswamy, Tampa, FL (US); Robert Luff, Whittman, MD (US)

(73) Assignee: The Nielsen Company (US), LLC, Schaumburg, IL (US)

( * ) Notice: Subject to any disclaimer, the term of this patent is extended or adjusted under 35 U.S.C. 154(b) by 970 days.

(21) Appl. No.: 13/037,318

(22) Filed: Feb. 28, 2011

(65) Prior Publication Data

US 2012/0219156 A1 Aug. 30, 2012

(51) Int. Cl.
- *H04H 60/32* (2008.01)
- *H04H 60/58* (2008.01)
- *G06Q 30/02* (2012.01)
- *H04H 60/31* (2008.01)

(52) U.S. Cl.
CPC ............... *G06Q 30/02* (2013.01); *H04H 60/58* (2013.01); *H04H 2201/90* (2013.01); *H04H 60/31* (2013.01)
USPC .................................... 725/18; 725/9; 725/19

(58) Field of Classification Search
CPC .......................... H04H 60/58; H04H 21/44008
USPC ................................................ 725/9, 18–19
See application file for complete search history.

(56) References Cited

U.S. PATENT DOCUMENTS

| | | | |
|---|---|---|---|
| 4,644,509 A | 2/1987 | Kiewit et al. | |
| 4,695,879 A | 9/1987 | Weinblatt | |
| 4,777,478 A | 10/1988 | Hirsch et al. | |
| 4,930,011 A | 5/1990 | Kiewit | |
| 5,093,921 A | 3/1992 | Bevins, Jr. | |
| 5,481,294 A | 1/1996 | Thomas et al. | |
| 5,740,035 A | 4/1998 | Cohen et al. | |

(Continued)

FOREIGN PATENT DOCUMENTS

| | | |
|---|---|---|
| EP | 0358911 | 7/1989 |
| EP | 0231427 | 2/1992 |

(Continued)

OTHER PUBLICATIONS

Kerschbaumer, Ken. "Who's Really Watching: How Cable's Digital Box Will Rock the Ratings World," B&C, Multichannel News and Prornax/BDA Proudly Announce the Brand Builder 5th Annual nwards, retrieved from http:www.broadcastingcable.com/index. asp?layout=articlePrint&articleID=CA601520, May 16, 2007 (3 pages).

(Continued)

*Primary Examiner* — Hunter B Lonsberry
(74) *Attorney, Agent, or Firm* — Hanley, Flight & Zimmerman, LLC

(57) ABSTRACT

Methods and apparatus to monitor media exposure are disclosed. An example implementation includes transmitting a start signal from a mailable meter to at least one mailable meter to at least one wearable meter; receiving a first audio at the mailable meter upon transmission of the start signal; receiving a second audio at the at least one wearable meter upon reception of the start signal; deriving a signature of the first received audio at the mailable meter; deriving a signature of the second received audio at the at least one wearable meter; transmitting the signature of the second received audio and an identification number from the at least one wearable meter to the mailable meter; and storing the signature of the first received audio and the identification number at the mailable meter as audience measurement data if the signature of the first received audio and the signature of the second received audio correlate.

34 Claims, 11 Drawing Sheets

(56) References Cited

U.S. PATENT DOCUMENTS

| | | |
|---|---|---|
| 5,872,588 A | 2/1999 | Aras et al. |
| 6,148,081 A | 11/2000 | Szymanski et al. |
| 6,243,007 B1 | 6/2001 | McLaughlin et al. |
| 6,298,218 B1 | 10/2001 | Lowe et al. |
| 6,327,570 B1 | 12/2001 | Stevens |
| 6,467,089 B1 | 10/2002 | Aust et al. |
| 6,513,046 B1 | 1/2003 | Abbott, III et al. |
| 6,647,548 B1 | 11/2003 | Lu et al. |
| 6,675,383 B1 | 1/2004 | Wheeler et al. |
| 6,754,570 B2 | 6/2004 | Iihoshi et al. |
| 6,842,877 B2 | 1/2005 | Robarts et al. |
| 6,868,292 B2 | 3/2005 | Ficco et al. |
| 7,100,181 B2 | 8/2006 | Srinivasan et al. |
| 7,111,317 B1 | 9/2006 | McIntyre et al. |
| 7,155,159 B1 | 12/2006 | Weinblatt et al. |
| 7,181,159 B2 | 2/2007 | Breen |
| 7,222,071 B2 | 5/2007 | Neuhauser et al. |
| 7,471,987 B2 | 12/2008 | Crystal et al. |
| 7,483,835 B2 | 1/2009 | Neuhauser et al. |
| 7,587,732 B2 | 9/2009 | Wright et al. |
| 8,023,882 B2 | 9/2011 | Croy et al. |
| 8,225,342 B2 | 7/2012 | Mears et al. |
| 8,296,172 B2 | 10/2012 | Marci et al. |
| 2002/0026635 A1 | 2/2002 | Wheeler et al. |
| 2003/0046685 A1 | 3/2003 | Srinivasan et al. |
| 2003/0070183 A1 | 4/2003 | Pierre et al. |
| 2003/0131350 A1 | 7/2003 | Peiffer et al. |
| 2003/0171833 A1 | 9/2003 | Crystal et al. |
| 2004/0210922 A1 | 10/2004 | Peiffer et al. |
| 2005/0071639 A1 | 3/2005 | Rodgers et al. |
| 2005/0177624 A1 | 8/2005 | Oswald et al. |
| 2005/0177745 A1 | 8/2005 | Oswald et al. |
| 2005/0177853 A1 | 8/2005 | Williams et al. |
| 2005/0216509 A1 | 9/2005 | Kolessar et al. |
| 2005/0257242 A1 | 11/2005 | Montgomery et al. |
| 2006/0059532 A1 | 3/2006 | Dugan et al. |
| 2006/0149964 A1 | 7/2006 | Chhabra |
| 2007/0226760 A1 | 9/2007 | Neuhauser et al. |
| 2007/0288277 A1 | 12/2007 | Neuhauser et al. |
| 2007/0294705 A1 | 12/2007 | Gopalakrishnan et al. |
| 2008/0109295 A1 | 5/2008 | McConochie et al. |
| 2008/0204273 A1 | 8/2008 | Crystal et al. |
| 2011/0106587 A1 | 5/2011 | Lynch et al. |
| 2012/0036018 A1 | 2/2012 | Feliciano et al. |

FOREIGN PATENT DOCUMENTS

| | | |
|---|---|---|
| EP | 0593202 | 4/1994 |
| EP | 1133090 | 11/2000 |
| EP | 1213860 | 6/2002 |
| EP | 1318679 | 6/2003 |
| JP | 2003078927 | 3/2003 |
| WO | 9504430 | 2/1995 |
| WO | 9512278 | 5/1995 |
| WO | 9810539 | 3/1998 |
| WO | 9959275 | 11/1999 |
| WO | 02052759 | 7/2002 |
| WO | 03060630 | 7/2003 |
| WO | 03095945 | 11/2003 |
| WO | 2005065159 | 7/2005 |
| WO | 2005071961 | 8/2005 |

OTHER PUBLICATIONS

International Patent Application Serial No. PCT/US60/801,336, entitled "Methods and Apparatus for Cooperator Installed Meters," filed on May 18, 2007 (46 pages).

METHODS AND APPARATUS TO MONITOR MEDIA EXPOSURE

TECHNICAL FIELD

The present disclosure pertains to monitoring media exposure and, more specifically to, methods and apparatus to monitor media exposure.

BACKGROUND

Media and advertising companies desire to know who is viewing their media and advertisements. Media monitoring companies accomplish this goal by enlisting a group of panelists and mailing a log to each the panelists. The log allows the panelists to write down the advertisements and media that they viewed. This monitoring method lends itself to problems, as panelists may record incorrect information, forget to record what they viewed, or fail to send the log back to the media monitoring company.

More modern mailable monitoring methods include media monitoring companies sending an electronic mailable meter to each panelist (or household of panelists) that may be installed by the panelist by simply powering the meter and placing the meter near a media location (e.g., near a television set). The mailable meter detects exposure to media and electronically stores a signature of the exposed media in a log. The stored monitoring information is then transmitted back to the media monitoring company, by either mailing the physical meter, electronic transmission, or by any other means.

DETAILED DESCRIPTION

Figure 1:
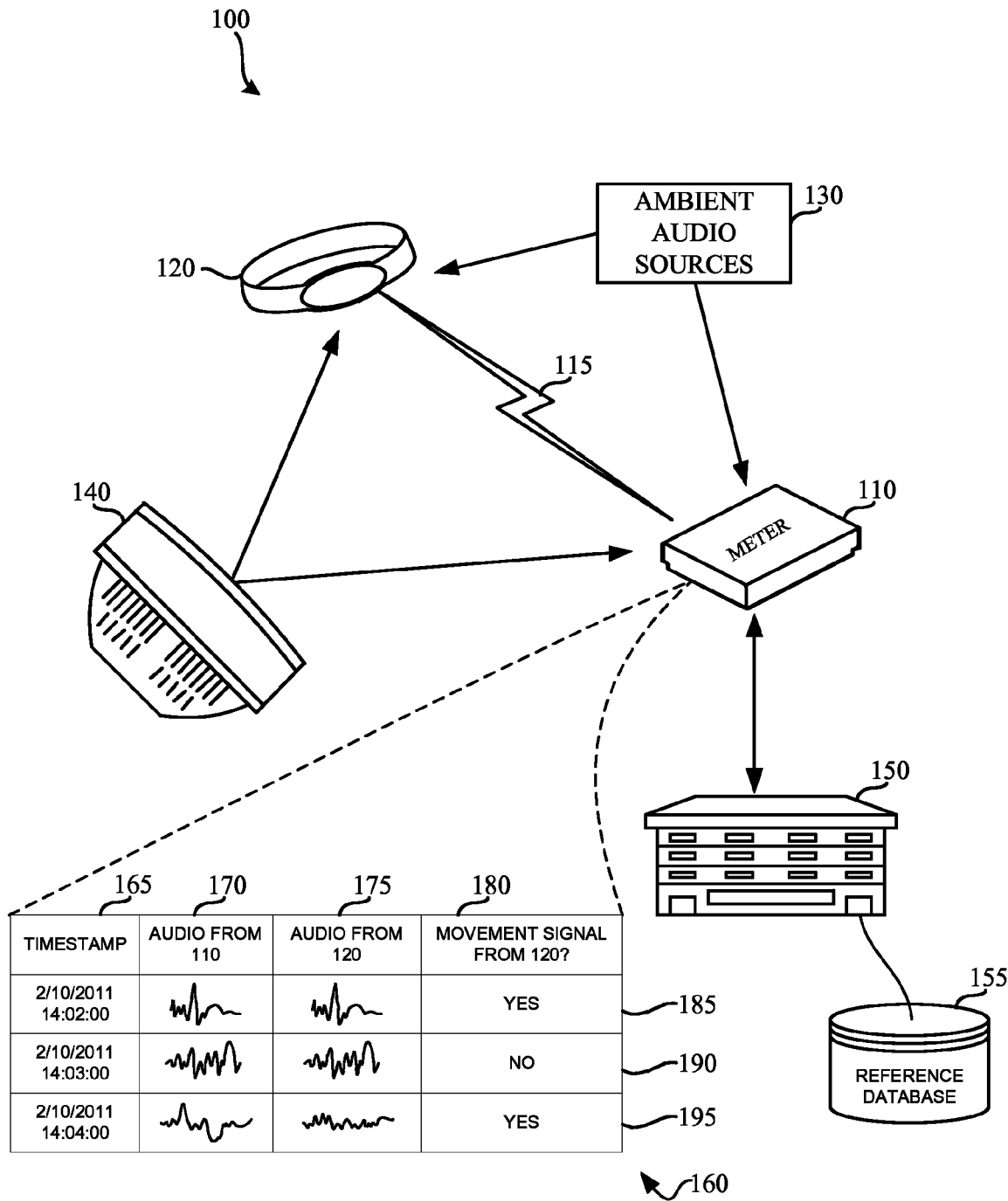
FIG. 1 is a block diagram of an example monitoring system to monitor media exposure.

Recently, media monitoring companies have sought to further identify individual panelists within a household of panelists, and determine which media each individual panelist is exposed to. In order to achieve this, the household of panelists receives a metering device, and each panelist receives a wearable meter (e.g., a bracelet) which can electronically identify itself to the metering device. The metering device then records information based on audio received by the metering device and the wearable meter as audience measurement data that may later be evaluated to determine exposure for various media.

In the examples provided herein, the metering device is described as a mailable meter. However, any other type of metering device could additionally or alternatively be used, such as, for example a portable meter. The mailable meter of the examples illustrated herein is mailed from the media monitoring company to the panelist or household of panelists. At a later time, the panelist or household of panelists will return the mailable meter to the media monitoring company (e.g., via the mail). Returning the mailable meter allows the media monitoring company to extract audience measurement data stored on the mailable meter. Additionally or alternatively, the metering device may electronically transmit the audience measurement data stored on the metering device.

Current methods of detecting which panelist is being exposed to media within proximity of the mailable meter have some flaws. For example, when the wearable meter identifies itself, it typically does so via radio frequency communication. Radio frequency communication does not allow the wearable meter and the mailable meter to determine if a particular wearable meter, and thereby the panelist associated with the wearable meter, is actually in the same room as the mailable meter (e.g., being exposed to the media), as radio frequency signals may reach the mailable meter from the wearable meter even when the panelist is in a different room.

In some embodiments, the wearable meter implements a wireless communication link to the mailable meter while additionally receiving audio via an audio receiver of the wearable meter. The audio receiver allows the wearable meter to detect audio to which the panelist is exposed. In the examples illustrated below, the wearable meter further comprises a processor for deriving an identifier such as a signature and/or audio code associated with the audio that is received, which is in turn transmitted to the mailable meter. However, alternative embodiments may transmit the received audio to the mailable meter, such that the mailable meter derives the identifier of the received audio.

The mailable meter may derive an identifier such as a signature and/or audio code associated with the audio received by an audio receiver of the mailable meter. The mailable meter may then perform a correlation of the two identifiers (one derived by the mailable meter, the other by the wearable meter), and determine if the panelist was exposed to the media presented near the mailable meter. If the identifiers correlate, then the exposure is credited to the panelist associated with the wearable meter. Additionally or alternatively, this correlation might be performed at a different location, such as an audience measurement data center. Further, the derivation of the identifiers associated with the received audio (of either the mailable meter or the wearable meter) might be performed at a location other than the point of audio reception. For example, derivation of the identifiers might be performed at the audience measurement data center.

The correlation of the two identifiers (one derived by the mailable meter, the other by the wearable meter) allow for a determination of whether the wearable meter was exposed to the same media as the mailable meter. This correlation does not, however, determine the actual media that the exposure was related to. The audience measurement data center additionally includes a reference database including signatures and/or codes associated with different broadcast media. When correlating the exposed media with the reference media, the audience measurement company can accurately determine the media that was exposed to the metering devices (the mailable meter and the wearable meter).

In any case, panelist privacy is of the utmost concern. To that end, after generation of an identifier associated with the received audio (whether at the wearable meter, the mailable meter, and/or the audience measurement data center), the source audio is either not permanently stored or deleted after generation of the identifier. In some examples, generation of an identifier associated with the received audio is performed at the mailable meter and/or the audience measurement data center (e.g., the received audio is transmitted in its original form to the mailable meter and/or the audience measurement data center by the wearable meter and/or the mailable meter, respectively). In such an example, the received audio is removed from the memory of the wearable meter and/or the mailable meter after it is transmitted.

FIG. 1 is a block diagram of an example monitoring system 100 to monitor media exposure. The example monitoring system 100 includes a mailable meter 110, a wearable meter 120, an ambient audio source 130, a monitored audio source 140, an audience measurement data center 150, and a reference database 155. The mailable meter 110 and the wearable meter 120 of the illustrated example communicate via a communication link 115. Additionally, FIG. 1 includes an example data set 160.

The mailable meter 110 of the illustrated example is sent to the panelist or household of panelists. Once received by the panelist or household of panelists, the mailable meter 110 is placed in a location where media is to be monitored such as, for example, near a television set. The mailable meter 110 collects ambient audio, computes signatures of the collected audio, and determines tuning from the signatures. The mailable meter 110 communicates with the wearable meter 120 (described in detail below) to determine whether the wearable meter 120 was exposed to the same audio as the mailable meter 110. From this determination, the mailable meter 110 can determine the media exposed to a panelist associated with the wearable meter 120.

In the illustrated example of FIG. 1, a single mailable meter 110 is shown. A single mailable meter 110 allows for monitoring of a single location (e.g., one room associated with one panelist or one household of panelists). However, the monitoring system 100 may comprise many mailable meters 110. For example, one mailable meter may be sent to each panelist or household of panelists (e.g., a panel may include many households of panelists). Additionally or alternatively, multiple mailable meters 110 may be sent to each household of panelists to allow for monitoring of multiple locations within the household. As an example, a first mailable meter 110 may be placed in a family room, while a second mailable meter 110 may be placed in a home office. In such an example, media presented in the family room may be monitored by the first mailable meter, while media presented in the home office may be monitored by the second mailable meter.

The mailable meter 110 of the illustrated example receives audio from both the ambient audio source 130 and the monitored audio source 140. In the illustrated example, audio is received via an audio receiver such as a microphone internal to the mailable meter 110. Additionally or alternatively, microphones may be placed external of the mailable meter 110 to allow for better reception of audio. External microphones may be coupled to the mailable meter via an audio cable, or via a wireless interface. Further, when wireless microphones are used, the wireless microphones can be easily placed in other locations within wireless transmission range of the mailable meter 110. For example, the mailable meter 110 having an internal microphone may be placed in the family room, while an external microphone may be placed in the home office. Thus, the mailable meter 110 is able to monitor both the family room and the home office without the need for additional mailable meters 110.

The wearable meter 120 of the illustrated example is associated with a single panelist, and allows the monitoring system to identify media presented to the panelist. However, when a household of panelists is to be monitored, multiple wearable meters 120 are provided to the panelists. The wearable meter 120 may be provided to each panelist in a given household (e.g., father, mother, son, daughter, etc.) As a result, each wearable meter 120 is preferably provided with a unique identifier that is appended or otherwise associated with the monitoring data that the wearable meter 120 receives (e.g., the wearable meter 120 includes functionality to add the identifier to the data it receives and/or transmits). The unique identifiers are associated with the individuals that carry the wearable meters 120 in, for example, a database at the audience measurement data center 150. As a result, when received at the audience measurement data center 150, the media monitoring company may associate demographic data (e.g., white male, age 43, income $50,000 per annum, etc.) with the received audience measurement data.

The wearable meter 120 of the illustrated example is a gel bracelet containing electronics. However, any other type of wearable meter may additionally or alternatively used such as, for example, a watch, a piece of jewelry, etc. The wearable meter 120 is worn by the panelist when they are near the mailable meter. Panelist cooperation is of the utmost importance to the monitoring company, as non-compliant panelists can produce erroneous monitoring results. Thus, the wearable meter 120 might be designed such that panelists are not averse to wearing the wearable meter 120.

Additionally or alternatively, the wearable meter 120 of the illustrated example might be any other device associated with a panelist. For example, the wearable meter 120 might be a mobile device (e.g., a cellular phone, a Bluetooth headset, a laptop, a tablet, etc.). For example, the wearable meter might be an Apple® iPhone® and/or an Apple® iPad.

The wearable meter 120 of the illustrated example has uniquely identifiable markings to associate each panelist in a household of panelists with a particular wearable meter 120. For example, each wearable meter 120 may be uniquely colored or designed such that each panelist can easily identify the wearable meter 120 to which they are associated. Further, identifying markings such as letters, numbers, special characters, and/or combinations thereof (e.g., a name or code) may be included on the wearable meter 120.

The wearable meter 120 of the illustrated example communicates with the mailable meter 110 to transmit media monitoring information via a communication link 115. In the illustrated example, the communication link 115 is a wireless communication link and is implemented according to the Institute of Electrical and Electronics Engineers 802.15.4 (ZigBee) communication protocol. However, any other method of wireless communication may alternatively be used (e.g., Bluetooth, Wi-Fi, cellular, radio frequency, etc.). Additionally or alternatively, any method of wired communication may be used such as, for example a universal serial bus (USB) connection, an Ethernet connection, etc.

The ambient audio source 130 of the illustrated example can be any audio source. Ambient audio sources typically contribute to errors in monitoring data (e.g., false signatures may be generated, etc.). However, ambient audio levels may be used comparatively to determine the perceived volume of monitored audio sources. For example, the mailable meter 110 is placed near a television in a first room. The mailable meter 110 will typically detect very low levels of ambient noise because it is in close proximity to the television. However, the wearable meter 120 may not be located in the first room (e.g., the wearable meter 120 may be located in a second room that is within wireless transmission range of the mailable meter 110). As such, the difference between the monitored audio and the ambient audio received, and thereby the generated and received signatures, by the wearable meter 120 is substantially different than the difference between the monitored audio and the ambient audio received by the mailable meter 110. Thus, the mailable meter 110 can determine that the wearable meter 120 was not in the same room as the mailable meter 110.

The monitored audio source 140 of the illustrated example is a television producing audio. However, any other device may additionally or alternatively produce audio to be monitored. For example, a terrestrial radio, an internet radio, computer, or any other device producing audio may be monitored. Further, the audio being monitored in the illustrated example is associated with broadcast media (e.g., broadcast television, broadcast radio, internet content, etc.). However, any other type of media may be additionally or alternatively monitored. For example, locally stored media (e.g., audio and/or video stored on a compact disc (CD), a digital versatile disc (DVD), a Blu-ray Disc (BD), a digital video recorder (DVR), an MP3 player, etc.), and/or remotely stored media (e.g., internet television, internet radio, video on demand services, etc.) may be used. While in the illustrated example, a single monitored audio source 140 is shown, some implementations may include multiple monitored audio sources. For example, a television and a radio may be present in the same room. Further, these multiple monitored audio sources 140 may produce audio at the same time.

The audience measurement data center 150 receives audience measurement data from the mailable meter 110. In the illustrated example, the audience measurement data center 150 receives audience measurement data from a single mailable meter 110. However, the audience measurement data center 150 may receive audience measurement data from any number of mailable meters 110.

The audience measurement data center 150 additionally includes the reference database 155. The reference database includes signatures and/or codes associated with different broadcast media. The audience measurement data center 150 may then correlate the received audience measurement data with the reference data to determine which media the exposure is to be credited to. The audience measurement company can accurately determine the media that was exposed to the metering devices (the mailable meter 110 and the wearable meter 120).

The audience measurement data in the example of FIG. 1 is shown as the data set 160. The data set 160 is a table indicating a timestamp 165, audio 170 from the mailable meter 110, audio 175 from the wearable meter 120, and a movement signal 180 from the wearable meter 120. At a first time 185, the audio 170 and the audio 175 substantially match and movement 180 was detected at the wearable meter 120. Thus, the panelist associated with the wearable meter 120 is credited with being exposed to the media presented in the vicinity of the mailable meter 110. At a second time 190, the audio 170 and the audio 175 substantially match. However, no movement 180 was detected at the wearable meter. Thus, while the wearable meter 120 was in the vicinity of the mailable meter 110 while media was being presented, the panelist was not wearing the wearable meter 120 and is not credited with being exposed to the media presented in the vicinity of the mailable meter 110. At a third time 195, the audio 170 and the audio 175 do not substantially match. It can then be assumed that the wearable meter 120 was not in the vicinity of the mailable meter 110 and, therefore, the panelist is not credited with being exposed to the media presented in the vicinity of the mailable meter 110.

Periodically and/or a-periodically (e.g., upon expiration of a timer, when a threshold of collected audience measurement data is reached, etc.,) the mailable meter 110 transmits the audience measurement data to the audience measurement data center 150. Any method of determining when to transmit audience measurement data may be used. For example, the mailable meter 110 may store audience measurement data up to a specified amount (e.g., 1 kB, 64 kB, 1 MB) before transmitting the audience measurement data, the mailable meter 110 may transmit audience measurement data at a fixed interval (e.g., 30 minutes, 3 hours, 1 day, 1 week, etc.), and/or the mailable meter 110 may transmit audience measurement data in response to an external event (e.g., user pushes a synchronize button, audience measurement data center 150 requests updated audience measurement data, etc.). The mailable meter 110 transmits audience measurement data to the audience measurement data center 150 via an Ethernet connection. However, the mailable meter 110 might use any other transmission medium such as, for example, a Digital Subscriber Line (DSL), Satellite, T1, Cellular radio, Wi-Fi, or any collection of transmission media. Further, the mailable meter 110 may be mailed to the media monitoring company so that audience measurement data stored on the mailable meter 110 may be transferred to the audience measurement data center 150.

As described above, the example system 100 facilitates transmission of audience measurement data from the mailable meter 110 and wearable meter 120 to the audience measurement data center 150. The system 100 may also facilitate bidirectional data transmission from, for example, the audience measurement data center 150 to the mailable meter 110 and wearable meter 120. The data transmitted by the audience measurement data center 150 may be software and/or firmware for devices such as, for example, the mailable meter 110 and/or the wearable meter 120. Additionally or alternatively, the data may be reference signatures, reference watermarks, reference codes, or any other data to facilitate the identification of media and/or, more generally, collection of audience measurement data. Further, the wearable meter 120 may have the facility to transmit audience measurement data directly to the audience measurement data center 150. For example, the wearable meter 120 may contain a cellular modem which would allow audience measurement data to be transmitted via a cellular network. Additionally or alternatively, the wearable meter(s) 120 may be mailed along with the mailable meter 110 such that audience measurement data stored on the wearable meter(s) 120 might be transferred to the audience measurement data center 150.

Figure 2:
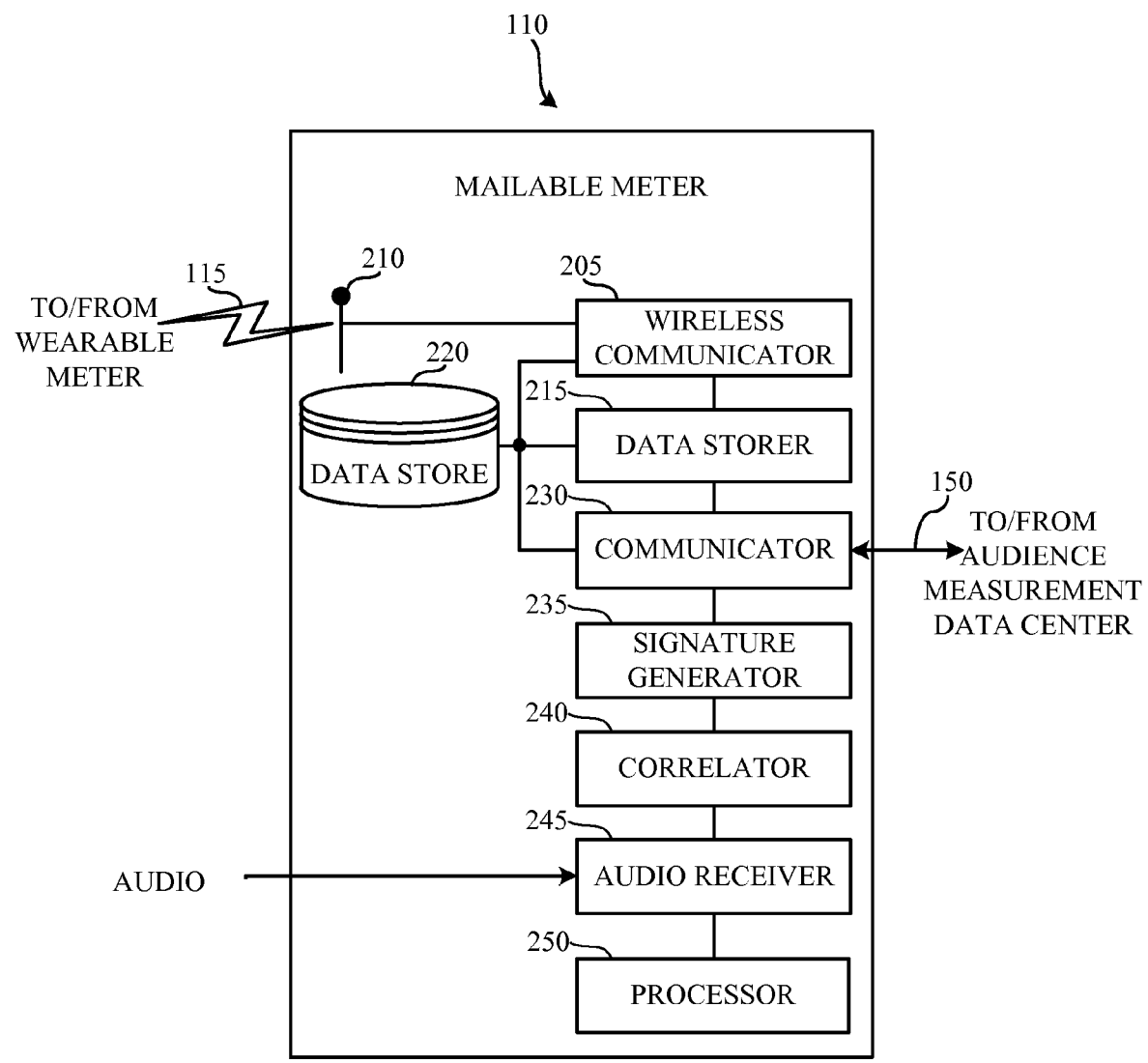
FIG. 2 is a block diagram of the example mailable meter of FIG. 1.

FIG. 2 is a block diagram of the example mailable meter 110 of FIG. 1. The mailable meter 110 of the illustrated example includes a wireless communicator 205, an antenna 210, a data store 215, a data store 220, a communicator 230, a signature generator 235, a correlator 240, an audio receiver 245, and a processor 250.

In the illustrated example the wireless communicator 205 communicates wirelessly with the wearable meter 120 via the antenna 210. While in the illustrated example the antenna 210 is shown as being separate from the wireless communicator 205, in some examples the antenna 210 may be integrated with the wireless communicator 205. The wireless communicator 205 of the illustrated example transmits instructions to the wearable meter 120 and receives audience measurement data from the wearable meter 120. In some embodiments, the mailable meter 110 may additionally include a wired communicator for communicating with the wearable meter 120. For example, while the wireless communicator 205 may wirelessly transmit instructions to the wearable meter 120 to gather audience measurement data via the wireless communicator 205 may receive the gathered audience measurement data from the wearable meter 120 the a wireless communication link such as, for example, a universal serial bus (USB) connection. Such a wired communicator may advantageously be used to charge a power source (e.g., a rechargeable battery) of the wearable meter 120.

The data storer 215 of FIG. 2 is implemented by processor executing instructions, but it could alternatively be implemented by an application specific integrated circuit (ASIC), digital signal processor (DSP), field programmable gate array (FPGA), and/or other circuitry. The data storer 215 receives audience measurement data from the wireless communicator 205 and stores the received audience measurement data in the data store 220. Further, the data storer 215 stores signatures and related audience measurement data generated by the signature generator 235. The data store 220 may also be capable of storing data which is not audience measurement data. For example, updated software and/or updated firmware may be stored in the data store 220. Further, updated software and/or updated firmware may be applied to the mailable meter 110 to update the functionality of the mailable meter 110. The data store 220 may be any device for storing data such as, for example, flash memory, magnetic media, etc. Furthermore, the data stored in the data store 220 may be in any data format such as, for example, binary data, delimited data, tab delimited data, structured query language (SQL), etc.

The communicator 230 sends stored audience measurement data to the audience measurement data center 150. In the illustrated example, the communicator 230 is implemented by an Ethernet connection. However, any type of communication medium may additionally or alternatively be used such as, for example, a cellular module, a satellite module, a digital subscriber line (DSL), etc. Advantageously, the communicator 230 is capable of communicating with the audience measurement data center 150 via the Internet (e.g., an Internet protocol connection). However, other communication methods and systems may be used such as, for example, a point to point connection, a private line, etc.

The signature generator 235 of the illustrated example is implemented by processor executing machine readable instructions, but it could alternatively be implemented by an ASIC, DSP, FPGA, or other circuitry. In the illustrated example, the signature generator 235 determines content identifiers from audio received by the audio receiver 245. As used herein, a "content identifier" is any type of data and/or information associated with, inherent two, embedded with, inferable from and/or injected into a piece of content, and which may be used to identify that piece of content. Audience measurement codes (e.g., watermarks), public or private identifiers in bit streams (e.g., program identification (PID) headers) closed captioning information, signatures, metadata or any other type(s) of data can serve as content identifiers. A content identifier is generally not noticeable to the audience during playback, but this is not necessarily so. Signatures may be any unique or semi-unique aspects of content (e.g., luminance characteristics, audio spectrum characteristics, etc.) that may be used to identify the content based on comparison to reference signatures. A code may be any type of data that may be inserted and, embedded in, encoded in, or otherwise associated with content or that may be extracted or determined from the content for comparison to reference codes. However, any data that may be useful in monitoring, identifying, crediting, or otherwise analyzing media content may be used.

The correlator 240 of the illustrated example is implemented by processor executing machine readable instructions, but it could alternatively be implemented by an ASIC, DSP, FPGA, or other circuitry. In the illustrated example, the correlator 240 compares signatures stored in the data store 220 originating from the signature generator 235 against signatures received from the wearable meter 120. The signatures from the wearable meter 120 are compared against the signatures from the signature generator 235 to determine proximity metrics. For example, if the two signatures are similar, then it can be construed that the wearable meter (and thus, the panelists associated with the wearable meter 120) was exposed to the same media content as the mailable meter 110. The correlator 240 then stores the correlation results as a proximity event in the data store 220. The proximity event is later transmitted to the audience measurement data center 150 so that the panelist can be credited and the monitoring data can be processed.

In the illustrated example, the audio receiver 245 of the mailable meter 110 is an internal microphone. The microphone receives ambient sound including audible media content presented in the vicinity of the mailable meter 110. Alternatively, the audio receiver 245 may be implemented by a line input connection. The line input connection may allow an external microphone to be used with the mailable meter 110. Advantageously, an external microphone may be placed in a location that might receive better quality audio than an internal microphone of the mailable meter 110. For example, an external microphone might be placed in front of a television, while the mailable meter 110 might be placed inside a cabinet containing multimedia components (e.g., a DVD player, a game console, a television receiver, an audio receiver, etc.). Additionally or alternatively, the audio receiver 245 may be implemented by a radio frequency receiver. The radio frequency receiver might allow for wireless microphones to be placed in a location that might receive better audio quality than the mailable meter 110.

Figure 3:
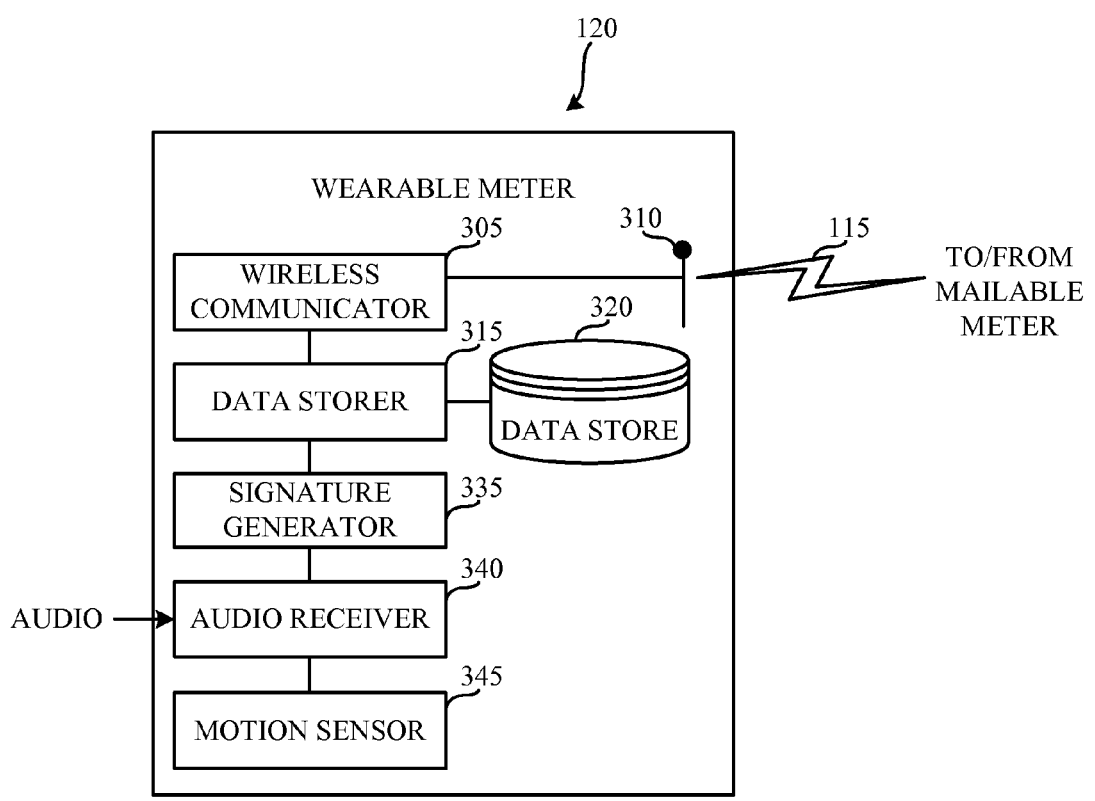
FIG. 3 is a block diagram of the example wearable meter of FIG. 1.

FIG. 3 is a block diagram of the example wearable meter 120 of FIG. 1. The example wearable meter 120 includes a wireless communicator 305, an antenna 310, a data storer 315, a data store 320, a signature generator 335, and audio receiver 340, and a motion sensor 345.

In the illustrated example the wireless communicator 305 communicates wirelessly with the mailable meter 110 via the antenna 310. While in the illustrated example the antenna 310 is shown as being separate from the wireless communicator 305, in some examples the antenna 310 may be integrated with the wireless communicator 305. The wireless communicator 305 of the illustrated example receives instructions from the mailable meter and transmits audience measurement to the wearable meter 110. In some embodiments, the wearable meter 120 may additionally include a wired communicator for communicating with the mailable meter 110. For example, while the wireless communicator 305 may wirelessly receive instructions from the mailable meter 110, the wired communicator may transmit audience measurement data to the mailable meter. In the illustrated example, the wired communicator is a universal serial bus (USB) connection. However, any other type of wired communication medium may additionally or alternatively be used. Such a wired communicator may advantageously be used to charge a power source (e.g., a rechargeable battery) of the wearable meter 120. Further, the wearable meter 120 may include external indicators (e.g., a light emitting diode (LED), a linear vibrator, a speaker, etc.) that may prompt the panelist to connect the wearable meter to the mailable meter. Such external indicators might be used to indicate that the rechargeable battery is low, or the data store 320 is nearing a data storage limit.

The data storer 315 of FIG. 3 is implemented by processor executing instructions, but it could alternatively be implemented by an application specific integrated circuit (ASIC), digital signal processor (DSP), field programmable gate array (FPGA), and/or other circuitry. The data storer 315 receives audience measurement data from the signature generator 335 and stores the received audience measurement data in the data store 320. The data store 320 may also be capable of storing data which is not audience measurement data. For example, updated software and/or updated firmware may be stored in the data store 320. Further, updated software and/or updated firmware may be applied to the wearable meter 120 to update the functionality of the wearable meter 120. The data store 320 may be any device for storing data such as, for example, flash memory, magnetic media, etc. Furthermore, the data stored in the data store 320 may be in any data format such as, for example, binary data, delimited data, tab delimited data, structured query language (SQL), etc.

The signature generator 335 of the illustrated example is implemented by processor executing machine readable instructions, but it could alternatively be implemented by an ASIC, DSP, FPGA, or other circuitry. In the illustrated example, the signature generator 335 determines content identifiers from audio received by the audio receiver 340. As used herein, a "content identifier" is any type of data and/or information associated with, inherent two, embedded with, inferable from and/or injected into a piece of content, and which may be used to identify that piece of content. Audience measurement codes (e.g., watermarks), public or private identifiers in bit streams (e.g., program identification (PID) headers) closed captioning information, signatures, metadata or any other type(s) of data can serve as content identifiers. A content identifier is generally not noticeable to the audience during playback, but this is not necessarily so. Signatures may be any unique or semi-unique aspects of content (e.g., luminance characteristics, audio spectrum characteristics, etc.) that may be used to identify the content based on comparison to reference signatures. A code may be any type of data that may be inserted and, embedded in, encoded in, or otherwise associated with content or that may be extracted or determined from the content for comparison to reference codes. However, any data that may be useful in monitoring, identifying, crediting, or otherwise analyzing media content may be used.

In the illustrated example, the audio receiver 340 of the wearable meter 120 is an internal microphone. The microphone receives ambient sound including audible media content presented in the vicinity of the wearable meter 120, and thus (when worn by the panelist) in the vicinity of the panelist.

The motion sensor 345 of the illustrated example stores motion data in the data store 320 of the wearable meter 120. The motion data may then later be used to determine if the panelist associated with the wearable meter 120 was wearing the device while media was presented to the wearable meter 120. For example, if a panelist left the wearable meter 120 on a table near the mailable meter 110 while a monitored audio source 140 was producing audio, the signature of the audio produced by the wearable meter 120 might match the signature of the audio produced by the mailable meter 110. However, the monitoring data should not be treated as valid because the wearable meter 120 was not being worn by panelist at the time that the monitoring event occurred (e.g., the panelist may not have been exposed to the audio).

While an example manner of implementing the monitoring system 100 of FIG. 1 has been illustrated in FIGS. 1, 2, and 3, one or more of the elements, processes, and/or devices illustrated in FIGS. 1, 2, and 3 may combined, divided, re-arranged, omitted, eliminated, and/or implemented in any other way. Further, the example wireless communicator 205, the example antenna 210, the example data store 215, the example data store 220, the example communicator 230, the example signature generator 235, the example correlator 240, the example audio receiver 245, the example processor 250, the example wireless communicator 305, the example wireless antenna 310, the example data storer 315, the example data store 320, the example signature generator 335, the example audio receiver 340, the example motion sensor 345 and/or, more generally, the example mailable meter 110 of FIGS. 1 and 2 and/or the example wearable meter 120 of FIGS. 1 and 3 may be implemented by hardware, software, firmware, and/or any combination of hardware, software, and/or firmware. Thus, for example, any of the example wireless communicator 205, the example wireless antenna 210, the example data store 215, the example data store 220, the example communicator 230, the example signature generator 235, the example correlator 240, the example audio receiver 245, the example processor 250, the example wireless communicator 305, the example wireless antenna 310, the example data storer 315, the example data store 320, the example signature generator 335, the example audio receiver 340, the example motion sensor 345 and/or, more generally, the example mailable meter 110 of FIGS. 1 and 2 and/or the example wearable meter 120 of FIGS. 1 and 3 could be implemented by one or more circuit(s), programmable processor(s), application specific integrated circuit(s) (ASIC(s)), programmable logic device(s) (PLD(s)) and/previous paragraph or field programmable logic device(s) (FPLD(s)), etc. When any of the appended apparatus claims are read to cover a purely software and/or firmware implementation, at least one of the example wireless communicator 205, the example wireless antenna 210, the example data store 215, the example data store 220, the example communicator 230, the example signature generator 235, the example correlator 240, the example audio receiver 245, the example processor 250, the example wireless communicator 305, the example wireless antenna 310, the example data storer 315, the example data store 320, the example signature generator 335, the example audio receiver 340, and/or the example motion sensor 345 are hereby expressly defined to include hardware and/or a computer readable medium such as a memory, DVD, CD, etc. storing the software and/or firmware. Further still, the example wireless communicator 205, the example wireless antenna 210, the example data store 215, the example data store 220, the example communicator 230, the example signature generator 235, the example correlator 240, the example audio receiver 245, the example processor 250, the example wireless communicator 305, the example wireless antenna 310, the example data storer 315, the example data store 320, the example signature generator 335, the example audio receiver 340, the example motion sensor 345 and/or more generally, the example mailable meter 110 of FIGS. 1 and 2 and/or the example wearable meter 120 of FIGS. 1 and 3 may include one or more elements, processes, and/or devices in addition to, or instead of, those illustrated in FIGS. 1, 2, and 3, and/or may include more than one of any or all of the illustrated elements, processes, and devices.

Flowcharts representative of example machine-readable instructions for implementing the mailable meter 110 and the wearable meter 120 of FIGS. 1, 2, and/or 3 are shown in FIGS. 4 through 9. In these examples, the machine-readable instructions comprise program(s) for execution by a processor such as the processor 1012 shown in the example processor system 1000 discussed below in connection with FIG. 10. The program may be embodied in software stored on a computer readable medium such as a CD-ROM, a floppy disk, a hard drive, a digital versatile disk (DVD), or a memory associated with the processor 1012, but the entire program(s) and/or parts thereof could alternatively be executed by a device other than the processor 1012 and/or embodied in firmware or dedicated hardware. Further, although the example program(s) are described with reference to the flowcharts illustrated in FIGS. 4 through 9, many other methods of implementing the example mailable meter 110 and/or the example wearable meter 120 may alternatively be used. For example, the order of execution of the blocks may be changed, and/or some of the blocks described may be changed, eliminated, or combined.

As mentioned above, the example processes of FIGS. 4 through 9 may be implemented using coded instructions (e.g., computer-readable instructions) stored on a tangible computer readable medium such as a hard disk drive, a flash memory, a read-only memory (ROM), a compact disk (CD), a digital versatile disk (DVD), a cache, a random-access memory (RAM) and/or any other storage media in which information is stored for any duration (e.g., for extended time periods, permanently, brief instances, for temporarily buffering, and/or for caching of the information). As used herein, the term tangible computer-readable medium is expressly defined to include any type of computer readable storage and to exclude propagating signals. Additionally or alternatively, the example processes of FIGS. 4 through 9 may be implemented using coded instructions (e.g., computer-readable instructions) stored on a non-transitory computer-readable medium such as a hard disk drive, a flash memory, a read-only memory, a compact disk, a digital versatile disk, a cache, a random-access memory and/or any other storage media in which information is stored for any duration (e.g., for extended time periods, permanently, brief instances, for temporarily buffering, and/or for caching of the information). As used herein, the term non-transitory computer-readable medium is expressly defined to include any type of computer-readable medium and to exclude propagating signals.

Figures 4A, 4B:
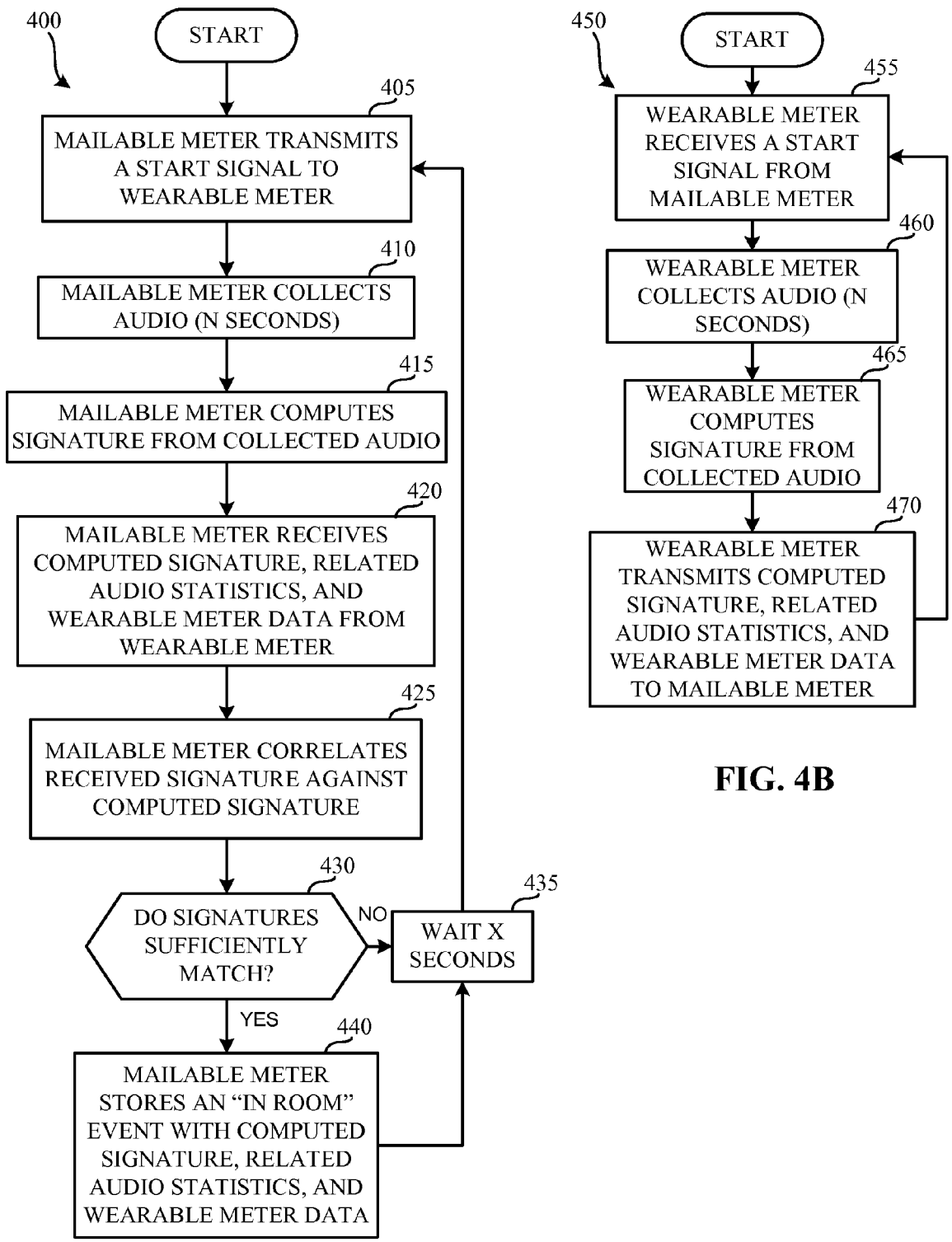
FIG. 4A is a flowchart representative of example machine-readable instructions that may be executed to implement the example mailable meter of FIGS. 1 and 2.
FIG. 4B is a flowchart representative of example machine-readable instructions that may be executed to implement the example wearable meter of FIGS. 1 and 2.

FIG. 4A is a flowchart representative of example machine-readable instructions 400 that may be executed to implement the example mailable meter 110 of FIGS. 1 and 2. The illustrated example shown in FIG. 4A describes a set of instructions that cause the mailable meter 110 to monitor audio sources near the mailable meter 110 by collecting audience measurement data from nearby wearable meters 120.

The instructions of FIG. 4A begin at block 405, where the wireless communicator 205 of the mailable meter 120 transmits a measurement signal to the wearable meter 120 (block 405). In the illustrated example, the measurement signal is a start measurement signal that includes a duration that the wearable meter 120 is to perform audio collection and signaturing in parallel with the mailable meter 110. However, the measurement signal might any other type of signal. For example, the measurement signal might be a synchronize measurements signal. The synchronize measurements signal might cause the mailable meter 110 and the wearable meter 120 to periodically perform audio collection and signaturing. Additional data may be transmitted with the measurement signal such as, for example, a period that the wearable meter 120 and the mailable meter 110 are to perform audio collection and signaturing.

Next, the audio receiver 245 of the mailable meter 110 collects audio (block 410). In the illustrated example, the audio receiver 245 collects audio for 5 seconds. However, any duration of collection may be used. For example, the duration may be 1 second, 2 seconds, 10 seconds, etc. Further, the duration of audio collection may be variable. For example, audio may be collected by the audio receiver 245 until enough audio is collected to allow the signature generator 235 to generate a signature for the collected audio.

The signature generator 235 of the mailable meter 110 then computes a signature from the collected audio (block 415). The computed signature is then stored in the data store 220 by the data storer 215.

The wireless communicator 205 then receives audience measurement data from the wearable meter (block 420). The audience measurement data received from the wearable meter 120 includes a computed signature, related audio statistics, and/or wearable meter data. The computed signature represents the audio that was measured in response to the measurement signal transmitted in block 405. The related audio statistics include information related to the audio that was recorded such as, for example, a loudness level of the audio. If, for example, the audio loudness level received from the wearable meter 120 is very low when compared to the mailable meter 110 it may be determined that the wearable meter 120 is not near the mailable meter 110. Lastly, the wearable meter data includes a wearable meter identifier that allows the mailable meter and/or the audience measurement data center 150 to associate the audience measurement data with a particular panelist.

The correlator 240 then correlates the received signature from the wearable meter 120 against the signature computed by the signature generator 235 of the mailable meter 110 (block 425). If the two signatures sufficiently match, the data store 215 stores and in-room event with the computed signature, related audio statistics, and/or wearable meter data in the data store 220 (block 440). The processor 250 of the mailable meter 110 then waits until the next measurement signal is to be transmitted to the wearable meter 120 (block 445). In the illustrated example, the processor 250 waits a determined amount of time. However, the processor 250 may wait any duration of time before transmitting the next measurement signal. For example, the processor 250 of the mailable meter 110 might monitor audio received by the audio receiver 245 to determine if media capable of being monitored is being presented in the vicinity of the mailable meter 110. If the two signatures do not sufficiently match in block 440, the processor 250 proceeds to wait until the next measurement signal is to be transmitted (block 435).

FIG. 4B is a flowchart representative of example machine-readable instructions 450 that may be executed to implement the example wearable meter of FIGS. 1 and 2. The example of FIG. 4B illustrates instructions which, when executed, caused the wearable meter 120 to receive measurement signal, collect measurement data, and transmit the measurement data to the mailable meter 110.

The instructions 450 of FIG. 4A begin at block 455, where the example machine-readable instructions 450 begin execution when the wireless communicator 305 receives a measurement signal from the wireless communicator 205 of the mailable meter 110 (block 455). In the illustrated example, the start signal received by the wireless communicator 305 indicates that the wearable meter 120 is to collect audio for 5 seconds. However, as described above, any duration of audio collection may be used. The audio receiver 340 of the wearable meter 120 then proceeds to collect audio (block 460). From the received audio, the signature generator 335 generates a signature (block 465). To protect panelist privacy, the received audio is not stored. The wireless communicator 305 then proceeds to transmit the computed signature, related audio statistics, and wearable meter data to the mailable meter 110 (block 470). After the wireless communicator 305 is transmits the audience measurement data, the wireless communicator 305 proceeds to wait for the next measurement signal from the mailable meter 110.

Figure 5:
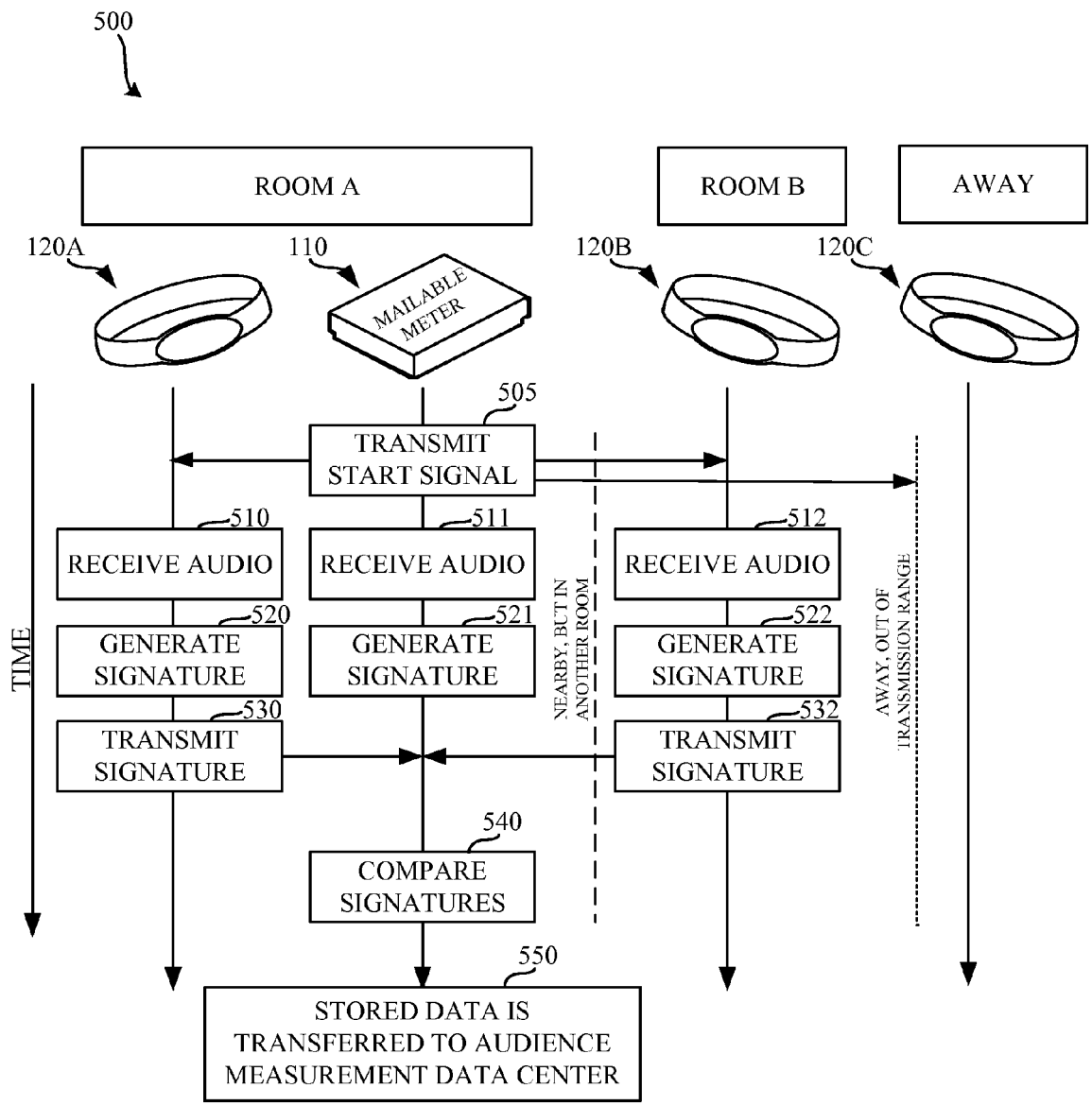
FIGS. 5, 5A, 6, 7, and 8 are diagrams representative of example machine-readable instructions that may be executed to implement the example monitoring system of FIG. 1.

FIG. 5 is a diagram representative of example machine-readable instructions 500 that may be executed to implement the example monitoring system 100 of FIG. 1. The instructions 500 represent a scenario wherein multiple wearable meters are located at various proximities to the mailable meter 110. The vertical axis of the diagram of FIG. 5 represents time, while the horizontal axis of the diagram represents different metering devices. Four metering devices are shown in FIG. 5. A mailable meter 110 and a first wearable meter 120A are located in a first room. A second wearable meter 120B is located in a second room that is nearby the first room, but within wireless transmission range of the mailable meter 110. A third wearable meter 120C is away from the first and second wearable meters 120A and 120B, and outside of wireless transmission range of the mailable meter 110.

The instructions 500 of FIG. 5 begin at block 505, where the example machine-readable instructions 500 begin execution when the mailable meter transmits a start signal (block 505). The start signal in the illustrated example is received by the first and second wearable meters 120A and 120B, however the start signal is not received by the third wearable meter 120C, as the third wearable meter 120C is outside of wireless transmission range of the mailable meter 110. Thus, the third wearable meter 120C does not create audience measurement data.

In response to receiving the start signal, the first and second wearable meters 120A and 120B receive audio along with the mailable meter 110 (blocks 510, 511, and 512). The first and second wearable meters 120A and 120B and the mailable meter 110 then proceed to generate signatures from the audio that was received (blocks 520, 521, and 522). Because the first wearable meter 120A is located in the same room as the wearable meter 120, similar audio is received by the first wearable meter 120A and the mailable meter 110, and thus similar signatures are generated by the first wearable meter 120A and the mailable meter 110. On the contrary, because the second wearable meter is 120B is located in a different room than the mailable meter 110, the audio received is different, and therefore the generated signatures are different. Next, the first and second wearable meters 120A and 120B transmit the generated signatures to the mailable meter 110 (blocks 530 and 532). After receiving the signatures, the mailable meter 110 compares the signatures received from the wearable meters to the signature generated by the wearable meter 110. Because the signature of the mailable meter 110 matches the signature generated by the first wearable meter 120A, the first mailable meter 120A is identified as being in the same room as the mailable meter 110, and a proximity event is recorded. Later, the stored data is electronically transferred to the audience measurement data center 150 by the mailable meter 110. In an additional or alternative example, the stored data is physically transferred to the audience measurement data center 150. For example, the mailable meter 110 might be mailed the audience measurement data center 150. Further still, instead of performing correlation of the generated signatures at the mailable meter 110 (e.g., as shown in block 540), correlation of the generated signatures may be performed at the audience measurement data center 150.

Figure 5A:
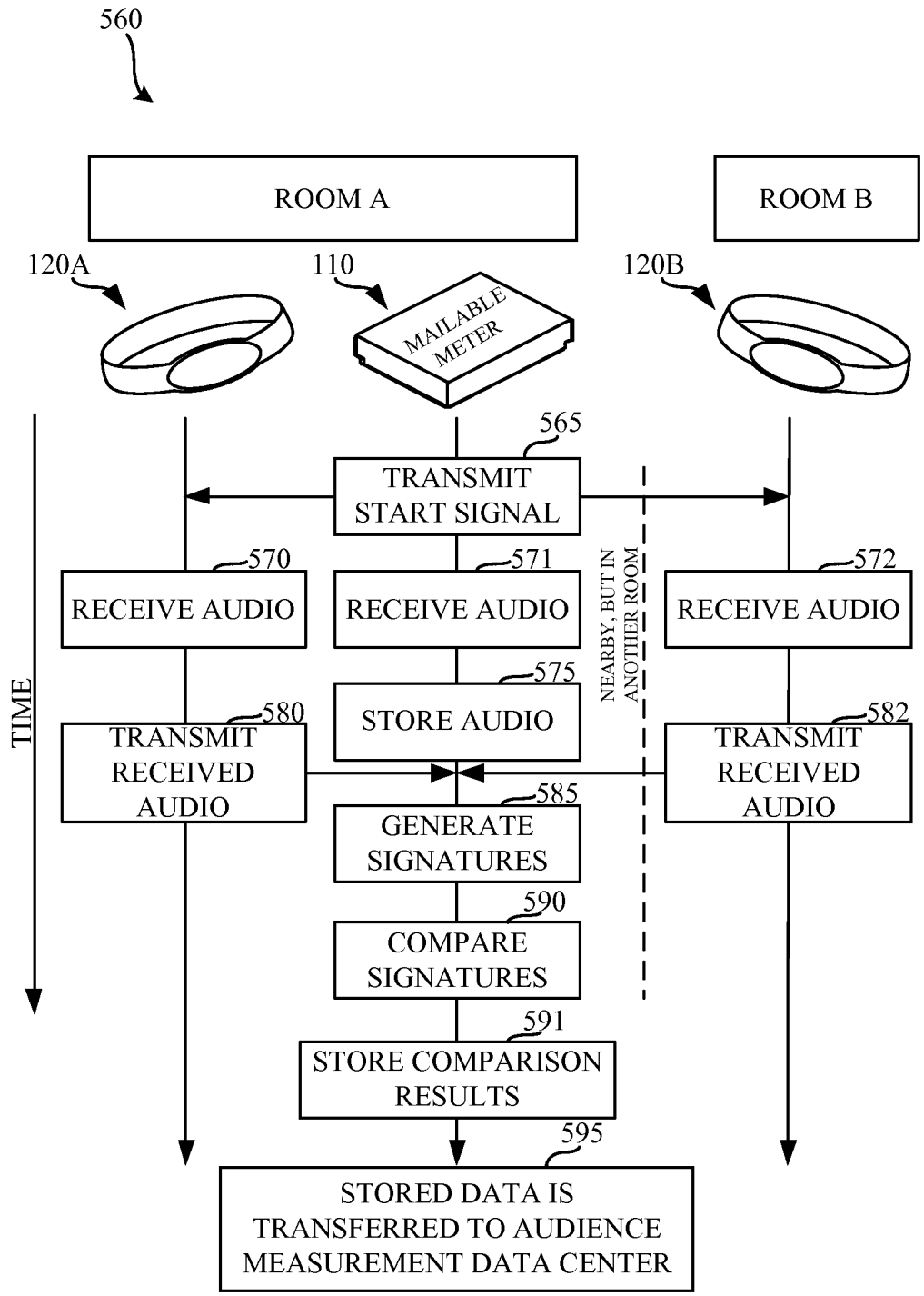

FIG. 5A is a diagram representative of example machine-readable instructions 560 that may be executed to implement the example monitoring system 100 of FIG. 1. The instructions 560 represent a scenario wherein multiple wearable meters are located at various proximities to the mailable meter 110. The vertical axis of the diagram of FIG. 5A represents time, while the horizontal axis of the diagram represents different metering devices. Three metering devices are shown in FIG. 5. A mailable meter 110 and a first wearable meter 120A are located in a first room, while a second wearable meter 120B is located in a second room that is nearby the first room, but within wireless transmission range of the mailable meter 110. In the example of FIG. 5A, the mailable meter transmits a measurement signal and receives audio. Upon receiving the measurement signal, the wearable meters 120A and 120B receive audio, and transmit the received audio to the mailable meter 110. The mailable meter then generates and compares signatures for the received audio.

The instructions 560 of FIG. 5A begin at block 565, where the example machine-readable instructions 560 begin execution when the mailable meter transmits a start signal (block 565). The start signal in the illustrated example is received by the first and second wearable meters 120A and 120B. In response to receiving the start signal, the first and second wearable meters 120A and 120B receive audio along with the mailable meter 110 (blocks 570, 571, and 572). The mailable meter 110 then stores the received audio (block 575). The wearable meters 120A and 120B then transmit the received audio to the mailable meter (block 580). The mailable meter then generates signatures from the audio that was received (block 585). Because the first wearable meter 120A is located in the same room as the wearable meter 120, similar audio is received by the first wearable meter 120A and the mailable meter 110, and thus similar signatures are generated by the first wearable meter 120A and the mailable meter 110. On the contrary, because the second wearable meter is 120B is located in a different room than the mailable meter 110, the audio received is different, and therefore the generated signatures are different. Next, the mailable meter 110 compares the generated signatures (block 590), and the results of the comparison are stored (block 591). Later, the stored data is transferred to the audience measurement data center 150 by the mailable meter 110 (block 595). In an additional or alternative example, instead of generating and comparing signatures, the mailable meter 110 may store the received audio (e.g., prior to block 585). The stored audio might then be electronically transmitted to the audience measurement data center 150, or the mailable meter 110 might then be mailed to the audience measurement data center 150 so that the stored data can be analyzed (e.g., the audience measurement data center 150 might generate and compare signatures).

Figure 6:
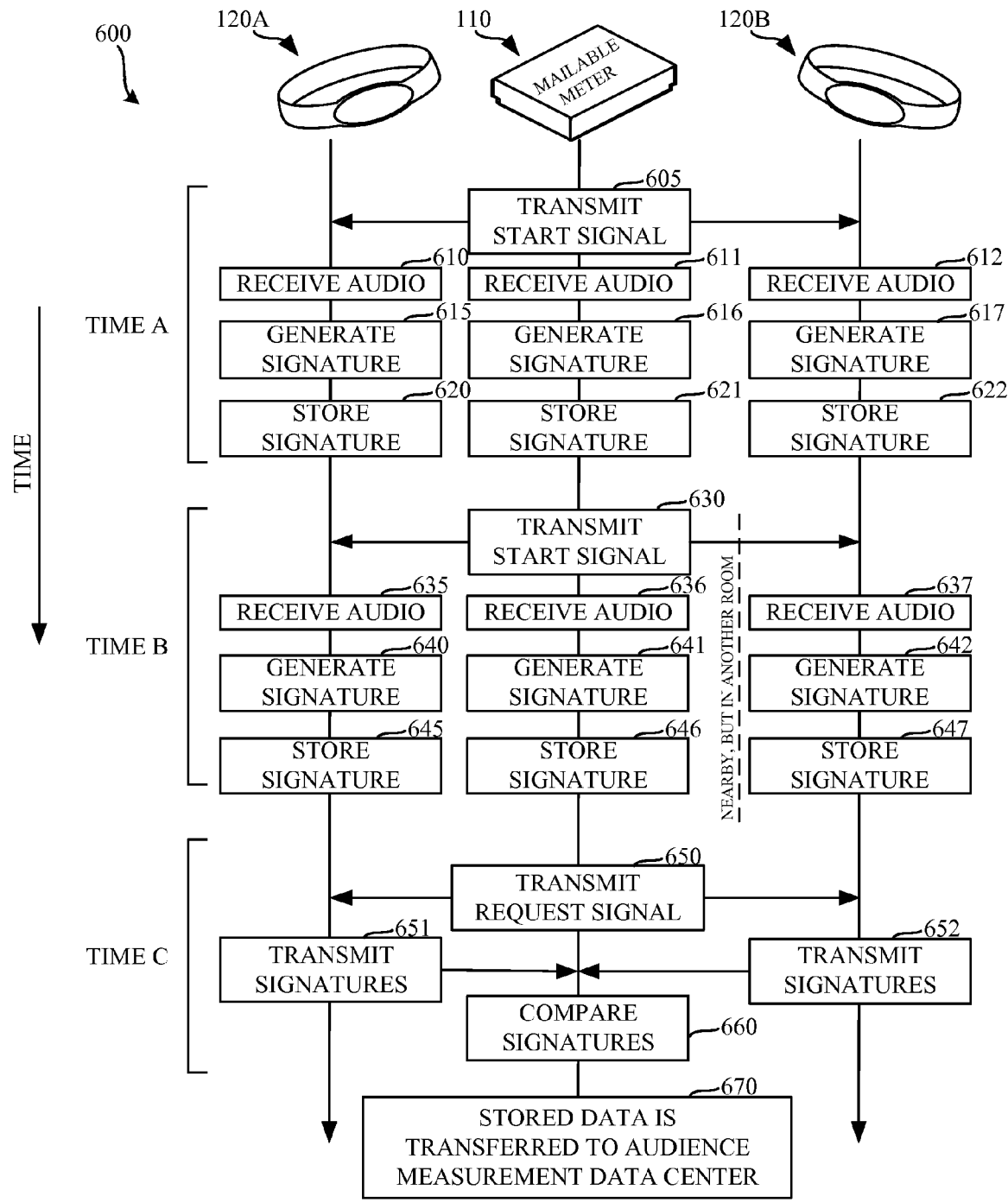

FIG. 6 is a diagram representative of example machine-readable instructions 600 that may be executed to implement the example monitoring system of FIG. 1. The instructions 600 represent a scenario wherein signatures are stored on the wearable meters 120 and periodically requested by the mailable meter 110. The vertical axis of the diagram of FIG. 6 represents time, while the horizontal axis of the diagram represents different metering devices. Three metering devices are shown in FIG. 6; a first wearable meter 120A, a mailable meter 110, and a second wearable meter 120B. The vertical axis of the diagram of FIG. 6 shows three segments of time. During time A both the first and second wearable meters 120A and 120B are in the same room as the mailable meter. During time B, the first wearable meter 120A is in the same room as the mailable meter 110, while the second wearable meter 120B is nearby, but in another room. During time C, the mailable meter 110 transmits a request signal to the nearby wearable meters 120A and 120B.

The instructions of FIG. 6 begin at block 605, where the example machine-readable instructions 600 begin when the mailable meter 110 transmits a start signal to the wearable meters 120A and 120B (block 605). The wearable meters 120A and 120B receive the start signal and then receive audio along with the mailable meter 110 (blocks 610, 611, and 612). The wearable meters 120A and 120B and the mailable meter 110 then generate signatures from the received audio (blocks 615, 616, and 617). The data storers 315 of the wearable meters 120A and 120B then store the generated signatures along with any other audience measurement data in the data stores 320 of the wearable meters 120A and 120B (blocks 620 and 622). The data storer 215 of the mailable meter 110 also stores the generated signature along with any other audience measurement data in the data store 220 of the mailable meter 110 (block 621). Because the first and second wearable meters 120A and 120B are located in the same room as the mailable meter 110 at time A, the signatures stored in the data stores 320 of the wearable meters 120A and 120B will match the signature stored in the data store 220 of the mailable meter 110 when compared at a later time.

At the start of time B, the mailable meter 110 transmits a start signal to the wearable mailable meters 120A and 120B (block 630). The wearable meters 120A and 120B receive the start signal and then receive audio along with the mailable meter 110 (blocks 635, 636, and 637). The second wearable meter 120B is nearby the mailable meter 110, but not located in the same room. Thus, the second wearable meter 120B receives audio that is substantially different from the audio received by the mailable meter 110. The wearable meters 120A and 120B and the mailable meter 110 then generate signatures from the received audio (blocks 640, 641, and 642). The data storers 315 of the wearable meters 120A and 120B then store the generated signatures along with any other audience measurement data in the data stores 320 of the wearable meters 120A and 120B (blocks 645 and 646). The data storer 215 of the mailable meter 110 also stores the generated signature along with any other audience measurement data in the data store 220 of the mailable meter 110 (block 646). Because the first wearable meter 120A is located in the same room as the mailable meter 110 at time B, the signature stored in the data store 320 of the first wearable meter 120A will match the signature stored in the data store 220 of the mailable meter 110 when compared at a later time.

At the start of time C, the mailable meter 110 transmits a request signal (block 650). The request signal causes the first and second wearable meters 120A and 120B to transmit the signatures and related audience measurement data stored in the data stores 320 of the wearable meters 120A and 120B to the mailable meter 110 (blocks 651 and 652). The mailable meter 110 then compares the signatures 660 to determine any proximity events should be recorded (block 660). Later, the stored data is transferred to the audience measurement data center 150 by the mailable meter 110.

Figure 7:
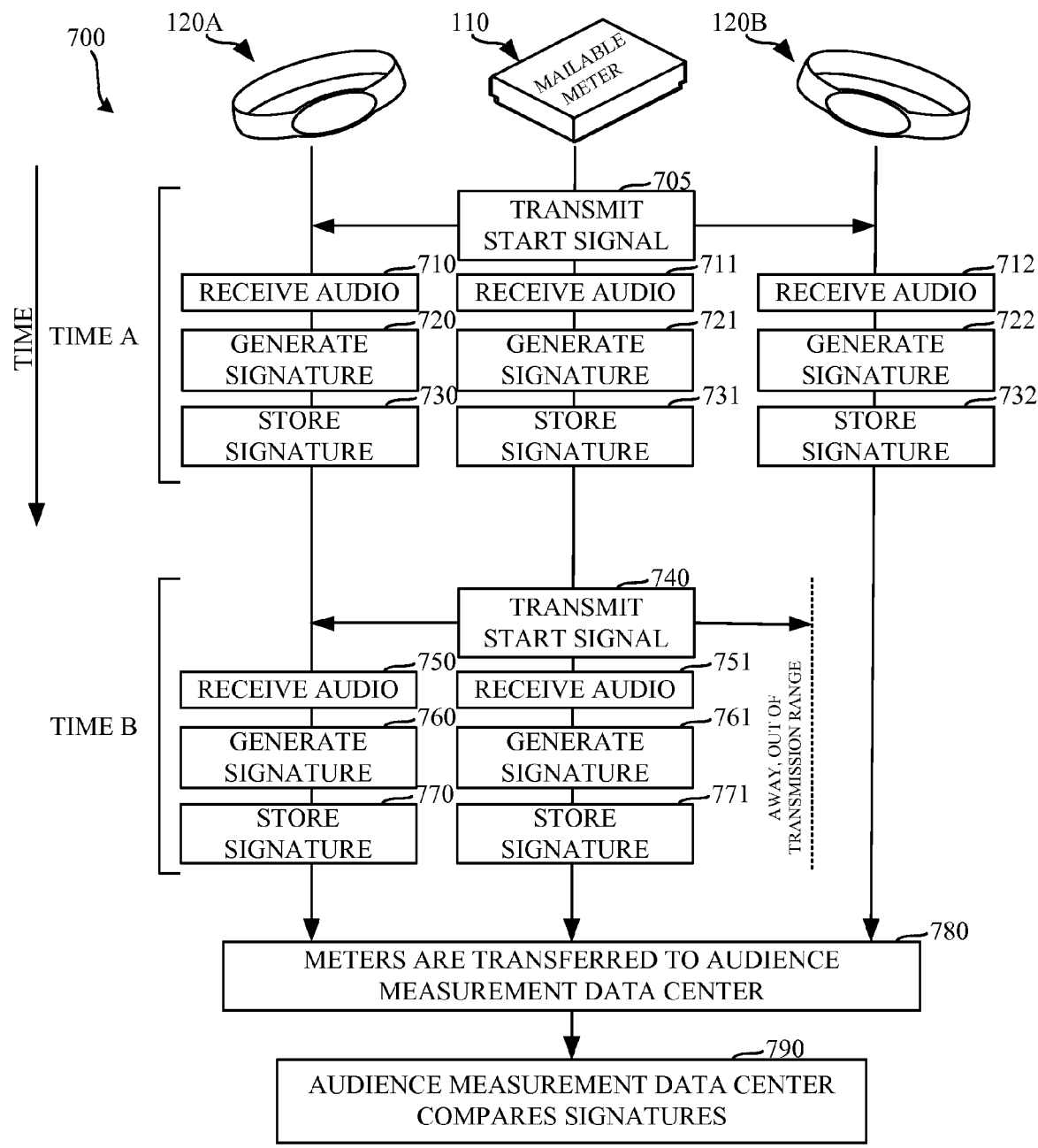

FIG. 7 is a diagram representative of example machine-readable instructions 700 that may be executed to implement the example monitoring system of FIG. 1. The instructions 700 represent a scenario wherein signatures are stored on the wearable meters 120 and mailable meter 110. The metering devices are later sent to the monitoring company, so that the stored signatures can be compared. The vertical axis of the diagram of FIG. 7 represents time, while the horizontal axis of the diagram represents different metering devices. Three metering devices are shown in FIG. 7; a first wearable meter 120A, a mailable meter 110, and a second wearable meter 120B. The vertical axis of the diagram of FIG. 7 shows two segments of time. During time A both the first and second wearable meters 120A and 120B are in the same room as the mailable meter. During time B, the first wearable meter 120A is in the same room as the mailable meter 110, while the second wearable meter 120B is outside of transmission range of the mailable meter 110. After a determined amount of time, the panelist and/or household of panelists send the wearable meters 120A and 120B and the mailable meter 110 to the audience measurement data center 150.

The instructions of FIG. 7 begin at block 705, where the example machine-readable instructions 700 begin when the mailable meter transmits a start signal to the wearable meters 120A and 120B (block 705). The wearable meters 120A and 120B receive the start signal and then receive audio along with the mailable meter 110 (blocks 710, 711, and 712). The wearable meters 120A and 120B and the mailable meter 110 then generate signatures from the received audio (blocks 720, 721, and 722). The data storers 315 of the wearable meters 120A and 120B then store the generated signatures along with any other audience measurement data in the data stores 320 of the wearable meters 120A and 120B (blocks 730 and 732). The data storer 215 of the mailable meter 110 also stores the generated signature along with any other audience measurement data in the data store 220 of the mailable meter 110 (block 731). Because the first and second wearable meters 120A and 120B are located in the same room as the mailable meter 110 at time A, the signatures stored in the data stores 320 of the wearable meters 120A and 120B will match the signature stored in the data store 220 of the mailable meter 110 when compared at a later time (e.g., at the audience measurement data center 150).

At the start of time B, the mailable meter 110 transmits a start signal to the wearable mailable meters 120A and 120B (block 740). The second wearable meter 120B is out of transmission range of the mailable meter 110, and therefore does not receive the instruction to begin monitoring (e.g., no signature or related audience measurement data are generated). The first wearable meter 120A receives the start signal and then receives audio along with the mailable meter 110 (blocks 750, and 751). The first wearable meter 120A and the mailable meter 110 then generate signatures from the received audio (blocks 760, and 761). The data storer 315 of the first wearable meter 120A then stores the generated signature along with any other audience measurement data in the data store 320 of the first wearable meters 120A (block 770). The data storer 215 of the mailable meter 110 also stores the generated signature along with any other audience measurement data in the data store 220 of the mailable meter 110 (block 771). Because the first wearable meter 120A is located in the same room as the mailable meter 110 at time B, the signature stored in the data store 320 of the first wearable meter 120A will match the signature stored in the data store 220 of the mailable meter 110 when compared at a later time.

Later, the first and second wearable meters 120A and 120B and the mailable meter 110 are sent to the audience measurement data center 150. In the illustrated example, the media monitoring devices are mailed to the media monitoring company so that the data stored on the media monitoring devices can be entered into the audience measurement data center 150. Lastly, the audience measurement data center 150 compares the signatures retrieved from the media monitoring devices (block 790).

Figure 8:
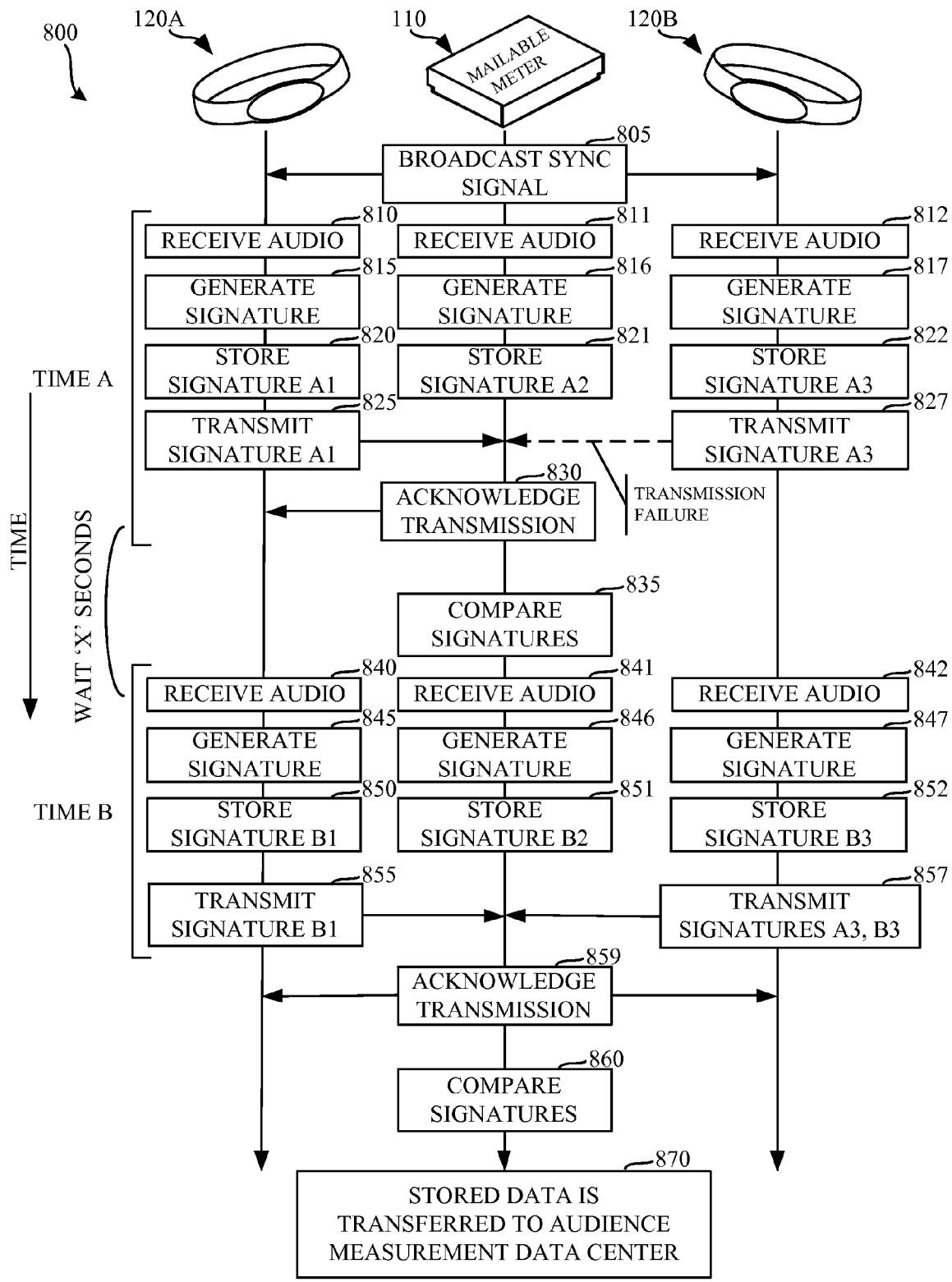

FIG. 8 is a diagram representative of example machine-readable instructions 800 that may be executed to implement the example monitoring system of FIG. 1. The instructions 800 represent a scenario wherein the mailable meter 110 transmits a synchronization signal. The synchronization signal instructs nearby wearable meters to perform monitoring at a defined interval and store the signature in the data stores 320 of the wearable meters 120A and 120B. In the illustrated example, the defined interval is thirty seconds. However, the defined interval may be any other interval. Upon collecting monitoring information, each wearable meter 120A and 120B attempts to transmit signatures stored on the data stores 320 of the wearable meters 120A and 120B the mailable meter 110. However, the audience measurement data stored in the data stores 320 of the wearable meters 120A and 120B might not be transmitted to the mailable meter 110. Rather, the wearable meters 120A and 120B might store the audience measurement data until the mailable meter transmits a request for the stored audience measurement data. Additionally or alternatively, the wearable meters 120A and 120B might store the audience measurement data until the wearable meters 120A and 120B are sent along with the mailable meter 110 to the monitoring company.

The instructions 800 of FIG. 8 begin at block 805, where the example machine-readable instructions 800 begin when the mailable meter 110 transmits the synchronization signal (block 805). The wearable meters 120A and 120B receive the synchronization signal and then receive audio along with the mailable meter 110 (blocks 810, 811, and 812). The wearable meters 120A and 120B and the mailable meter 110 then generate signatures from the received audio (blocks 815, 816, and 817). The data storers 315 of the wearable meters 120A and 120B then store the generated signatures (signatures A1 and A3) along with any other audience measurement data in the data stores 320 of the wearable meters 120A and 120B (blocks 820 and 822). The data storer 215 of the mailable meter 110 also stores the generated signature (signature A2) along with any other audience measurement data in the data store 220 of the mailable meter 110 (block 821). Because the first and second wearable meters 120A and 120B are located in the same room as the mailable meter 110 at time A, the signatures stored in the data stores 320 of the wearable meters 120A and 120B will match the signature stored in the data store 220 of the mailable meter 110. Next, the wearable meters 120A and 120B attempt to transmit the signatures stored in the data stores 320 of the wearable meters 120A and 120B (blocks 825 and 827). In the illustrated example, the signature transmission of the second wearable meter 120B fails. Thus, the mailable meter 110 does not receive signature A3. The transmission of the signature A3 from the second wearable meter 120B in the illustrated example failed because the wearable meter 120B moved out of transmission range. However, the failure could have occurred for any other reason. The mailable meter 110 then acknowledges the transmission (block 830), which informs the first wearable meter 120A that the stored signature can be removed from the data store 320 of the first wearable meter 120A to allow for future signatures to be stored. After receiving the acknowledgement, the first wearable meter 120A might remove the transmitted signatures from memory to protect user privacy. The second wearable meter 120B does not receive the acknowledgement, and transmission of the signature A3 will be re-attempted at a later time. The mailable meter 110 then proceeds to perform comparison of the received signature (signature A1) against the stored signature (signature A2) (block 835), and stores a proximity event in association with signature A1.

After waiting the duration specified along with the synchronization signal, the wearable meters 120A and 120B then receive audio along with the mailable meter 110 (blocks 840, 841, and 842). The wearable meters 120A and 120B and the mailable meter 110 then generate signatures from the received audio (blocks 845, 846, and 847). The data storers 315 of the wearable meters 120A and 120B then store the generated signatures (signatures B1 and B3) along with any other audience measurement data in the data stores 320 of the wearable meters 120A and 120B (blocks 850 and 852). The data storer 215 of the mailable meter 110 also stores the generated signature (signature B2) along with any other audience measurement data in the data store 220 of the mailable meter 110 (block 851). Because the first and second wearable meters 120A and 120B are located in the same room as the mailable meter 110 at time B, the signatures B1 and B3 will match the signature B2. Next, the wearable meters 120A and 120B attempt to transmit the signatures stored in the data stores 320 of the wearable meters 120A and 120B (blocks 855 and 857). In the illustrated example, the second wearable meter 120B transmits two signatures (e.g., a signature associated with time A (signature A3) and a signature associated with time B (signature B3)) to the mailable meter 110 because the transmission of the signature A3 had not yet been successfully transmitted. The mailable meter 110 then acknowledges the transmissions (block 859) and compares the transmitted signatures (block 860). After receiving the acknowledgement, the first and second wearable meters 120A and 120B might remove the transmitted signatures from memory to protect user privacy. Proximity events are stored in association with signatures A3, B1, and B3. The compared signatures and/or stored proximity events are then transmitted to the audience measurement data center 150 (block 870).

Figure 9:
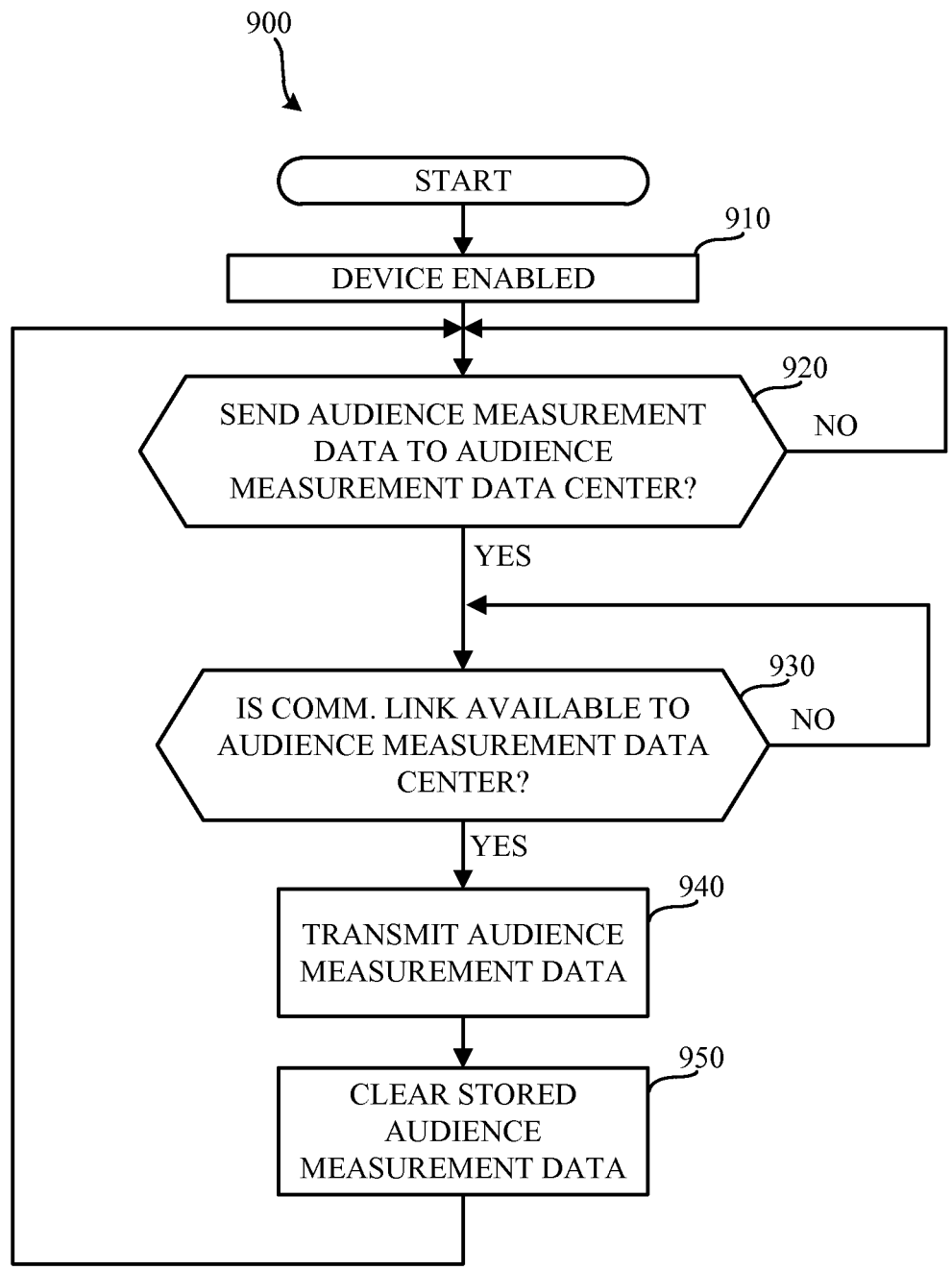
FIG. 9 is a flowchart representative of example machine-readable instructions that may be executed to implement the audience measurement data transmission process of the example mailable meter of FIGS. 1 and 2.

FIG. 9 is a flowchart representative of example machine-readable instructions that may be executed to implement the audience measurement data transmission process of the example mailable meter of FIGS. 1 and 2. The program of FIG. 9 begins at block 910, where the example machine-readable instructions 900 begin execution by enabling the mailable meter 110 (block 910). Next, the processor 250 determines if audience measurement data should be transmitted to the audience measurement data center 150 (block 920). In the illustrated example, the processor 250 determines that data is to be transmitted once every day. However, any other period of time may additionally or alternatively be used. Further, the processor 250 might determine that data is to be transmitted a-periodically (e.g., when a threshold of collected audience measurement data is reached, etc.). For example, the processor 250 may determine that a specified amount of data (e.g., 1 kB, 64 kB, 1 MB) is stored in the data store 220 before transmitting the audience measurement data. Additionally or alternatively, the processor may determine that audience measurement data should be transmitted in response to an external event (e.g., user pushes a synchronize button, audience measurement data center 150 requests updated audience measurement data, etc.). If the processor 250 determines that audience measurement data should not be sent, the processor 250 proceeds to wait until an acceptable time for audience measurement data to be sent.

Once the processor 250 determines that audience measurement data is to be sent, the communicator 230 determines if a communication link is available (block 930). For example, the communicator 230 attempts to connect to the audience measurement data center 150. If a communication link is not available, the communicator 230 continually attempts to transmit audience measurement data to the audience measurement data center 150. If a communication link is available, the communicator 230 transmits audience measurement data (block 940). Once the audience measurement data is transmitted, the audience measurement data is removed from the data store 220 (block 950). Removing the audience measurement data may be performed to, for example, allow for new audience measurement data to be recorded and/or to protect panelist privacy.

Figure 10:
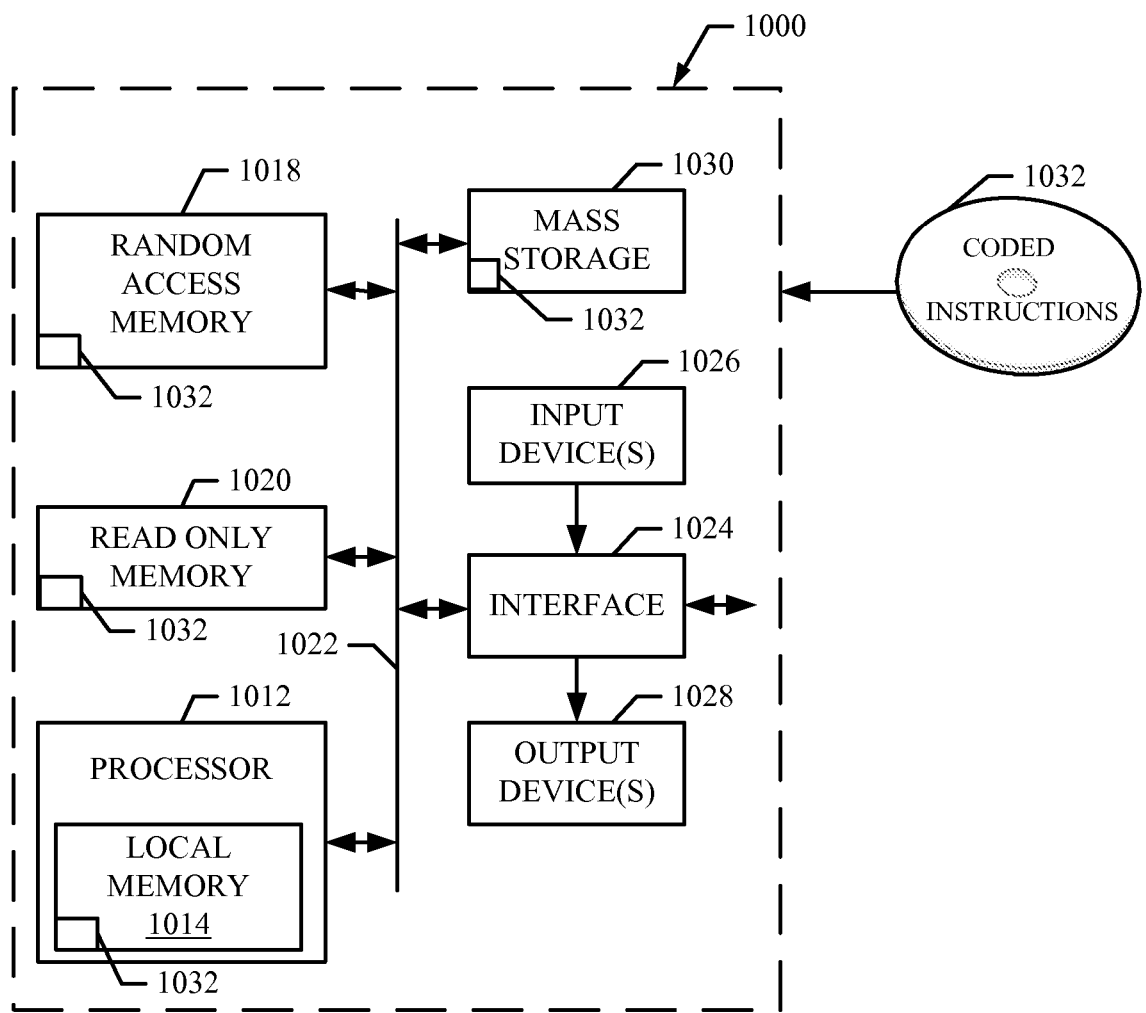
FIG. 10 is a block diagram of an example processor system that may execute, for example, the machine-readable instructions of FIGS. 4 through 9 to implement the example mailable meter of FIGS. 1 and 2; and the example wearable meter of FIGS. 1 and 3.

FIG. 10 is a block diagram of an example processor system 1000 that may execute, for example, the machine-readable instructions of FIGS. 4 through 9 to implement the example mailable meter 110 of FIGS. 1 and 2; and the example wearable meter 120 of FIGS. 1 and 3. The processor system 1000 can be, for example, a server, a personal computer, a set top box, an internet appliance, a mobile device (e.g., a personal digital assistant, a cellular phone, etc.) or any other type of computing device.

The processor system 1000 of the instant example includes a processor 1012. For example, the processor 1012 can be implemented by one or more Intel® microprocessors from the Pentium® family, the Itanium® family or the XScale® family. Of course, other processors from other families are also appropriate.

The processor 1012 is in communication with a main memory including a volatile memory 1018 and a non-volatile memory 1020 via a bus 1022. The volatile memory 1018 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1020 may be implemented by flash memory and/or any other desired type of memory device. Access to the main memory 1014 is typically controlled by a memory controller (not shown).

The processor system 1000 also includes an interface circuit 1024. The interface circuit 1024 may be implemented by any type of interface standard, such as an Ethernet interface, a universal serial bus (USB), and/or a PCI express interface.

One or more input devices 1026 are connected to the interface circuit 1024. The input device(s) 1026 permit a user to enter data and commands into the processor 1012. The input device(s) can be implemented by, for example, a keyboard, a mouse, a touchscreen, a track-pad, a trackball, isopoint and/or a voice recognition system.

One or more output devices 1028 are also connected to the interface circuit 1024. The output devices 1028 can be implemented, for example, by display devices (e.g., a liquid crystal display, a cathode ray tube display (CRT), a printer and/or speakers). The interface circuit 1024, thus, typically includes a graphics driver card.

The interface circuit 1024 also includes a communication device (e.g., the wireless communicator 205, the communicator 230, and/or the wireless communicator 205) such as a modem or network interface card to facilitate exchange of data with external processor systems via a network (e.g., an Ethernet connection, a digital subscriber line (DSL), a telephone line, coaxial cable, a cellular telephone system, a Bluetooth connection, etc.).

The processor system 1000 also includes one or more mass storage devices 1030 for storing software and data. Examples of such mass storage devices 1030 include floppy disk drives, hard drive disks, compact disk drives, and digital versatile disk (DVD) drives. The mass storage device 1030 may implement the data store 220 and/or the data store 320.

The coded instructions 1032 of FIGS. 4 through 9 may be stored in the mass storage device 1030, in the volatile memory 1018, in the non-volatile memory 1020, in the local memory 1014, and/or on a removable storage medium such as a CD or DVD.

From the foregoing, it will be appreciated that example methods, apparatus and articles of manufacture have been disclosed which allow audience measurement systems to determine if a viewer is within proximity of a monitored audio source.

Although certain example methods, apparatus, and articles of manufacture have been described herein, the scope of coverage of this patent is not limited thereto. On the contrary, this patent covers all methods, apparatus, and articles of manufacture fairly falling within the scope of the claims of this patent.

The invention claimed is:

1. A method of monitoring media exposure comprising:
receiving a first audio at a first meter;
deriving a first identifier associated with the first audio;
receiving an identification code and at least one of a second audio and a second identifier associated with the second audio from a second meter, wherein the identification code is uniquely associated with the second meter; and
storing the first identifier associated with the first audio and the identification code associated with the second meter if the first identifier and the second identifier substantially match.

2. The method as described in claim 1, wherein storing the first identifier associated with the first audio and the identification code associated with the second meter if the first identifier and the second identifier substantially match is performed at the first meter.

3. The method as described in claim 2, further comprising transmitting the first identifier associated with the first audio and the identification code associated with the second meter from the first meter to an audience measurement data center.

4. The method as described in claim 1, further comprising:
transmitting the first identifier associated with the first audio, the identification code, and the at least one of the second audio and the second identifier associated with the second audio from the first meter to an audience measurement data center; and
wherein storing the first identifier associated with the first audio and the identification code associated with the second meter if the first identifier and the second identifier substantially match is performed at the audience measurement data center.

5. The method defined in claim 1, wherein the first meter and second meter are communicatively coupled by a wireless connection.

6. The method defined in claim 1, wherein the second meter computes a gain level for the second audio.

7. The method defined in claim 6, wherein the gain level for the second audio is transmitted to the first meter and is used to determine if the first identifier and the second identifier sufficiently match.

8. The method defined in claim 1, further comprising:
receiving a movement signal indicative of movement of the second meter at the time of receiving the second audio at the first meter; and
wherein storing the first identifier associated with the first audio and the identification code associated with the second meter if the first identifier and the second identifier substantially match is performed when the movement signal indicates movement at the time of receiving the second audio at the first meter.

9. The method as defined in claim 1, wherein deriving a first identifier associated with the first audio and receiving an identification code and at least one of a second audio and a second identifier associated with the second audio from a second meter are performed at an audience measurement data center.

10. The method as defined in claim 9, wherein storing the first identifier associated with the first audio and the identification code associated with the second meter if the first identifier and the second identifier substantially match is performed at the audience measurement data center.

11. The method as described in claim 1, wherein the first meter is a mailable meter.

12. The method as described in claim 1, wherein the second meter is a wearable meter.

13. The method as described in claim 12, wherein the second meter is a bracelet.

14. The method as described in claim 1, further comprising transmitting a measurement signal from the first meter to the second meter instructing the second meter to receive the second audio.

15. The method as described in claim 14, wherein the measurement signal further instructs the second meter to derive the second identifier associated with the second audio.

16. A system to monitor media exposure comprising:
   a first meter to receive first audio, compute a first identifier for the first audio, receive a second identifier from a second meter, and store the first and second identifiers; and
   the second meter to receive a second audio, compute the second identifier for the second audio, and transmit the second identifier to the first meter, the second meter to transmit an identification code uniquely associated with the second meter to the first meter, the first meter to, if the first identifier and the second identifier substantially match, store (A) at least one of the first identifier and the second identifier, and (B) the identification code.

17. The system as described in claim 16, wherein the first meter is further to compare the first and second identifiers to determine if the same audio was received by both the first meter and the second meter, and store audience measurement data comprising a timestamp and the at least one of the first identifier and the second identifier.

18. The system as described in claim 16, further comprising an audience measurement data center to:
   receive the first and second identifiers from the first meter;
   compare the first and second identifiers to determine if the same audio was received by both the first meter and the second meter; and
   store audience measurement data comprising a timestamp and at least one of the first and second identifiers.

19. The system as described in claim 18, wherein receiving the first and second identifiers from the first meter is performed by transporting the first meter to the audience measurement data center.

20. The system as described in claim 18, wherein receiving the first and second identifiers from the first meter is performed by electronically transmitting the first and second identifiers from the first meter to the audience measurement data center.

21. The system as described in claim 16, wherein the second meter is to transmit a movement signal indicative of movement of the second meter, the first meter to receive the movement signal and to store the indication of movement of the second meter.

22. The system as described in claim 16, wherein the first meter is a mailable meter.

23. The system as described in claim 16, wherein the second meter is a wearable meter.

24. The system as described in claim 17, further comprising an audience measurement data center to receive the audience measurement data.

25. The system as described in claim 24, wherein receiving the audience measurement data is performed by transporting the first meter to the audience measurement data center.

26. The system as described in claim 24, wherein receiving the audience measurement data is performed by electronically transmitting the audience measurement data from the first meter to the audience measurement data center.

27. The system as described in claim 16, wherein the transmission between the second meter and the first meter is implemented according to an Institute of Electrical and Electronics Engineers 802.15.4 standard.

28. An apparatus to monitor media exposure, the apparatus comprising:
   an audio receiver to receive audio;
   a data storer to store the received audio in a data store;
   a communicator to transmit the audio stored in the data store to a metering device; and
   a housing to include the audio receiver, the data storer, the data store, and the communicator, wherein the housing is a gel bracelet.

29. The apparatus as described in claim 28, wherein the metering device is a mailable meter.

30. The apparatus as described in claim 28, further comprising:
   an identification generator to generate an identifier associated with the received audio,
   wherein the data storer is to store the identifier in the data store and wherein the communicator is to transmit the identifier associated with the received audio to the metering device.

31. The apparatus as described in claim 28, wherein the communicator is a wireless communicator.

32. The apparatus as described in claim 30, wherein the identifier associated with the received audio comprises an audio signature.

33. The apparatus as described in claim 30, wherein the identifier associated with the received audio comprises an audio code.

34. The apparatus as described in claim 28, further comprising:
   a motion sensor to generate an identifier associated with movement of the housing;
   wherein the data storer additionally stores the identifier associated with the movement of the housing; and
   wherein the communicator additionally transmits the identifier associated with the movement of the housing to the metering device.

* * * * *